US012513756B2

(12) United States Patent
Motozuka et al.

(10) Patent No.: US 12,513,756 B2
(45) Date of Patent: Dec. 30, 2025

(54) COMMUNICATION APPARATUS AND COMMUNICATION METHOD

(71) Applicant: Panasonic Intellectual Property Management Co., Ltd., Osaka (JP)

(72) Inventors: Hiroyuki Motozuka, Kanagawa (JP); Kosei Nakano, Kanagawa (JP); Takenori Sakamoto, Kanagawa (JP); Akihiro Egami, Tokyo (JP); Masataka Irie, Kanagawa (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 401 days.

(21) Appl. No.: 18/153,303

(22) Filed: Jan. 11, 2023

(65) Prior Publication Data
US 2023/0141726 A1    May 11, 2023

Related U.S. Application Data

(63) Continuation of application No. PCT/JP2021/025017, filed on Jul. 1, 2021.

(30) Foreign Application Priority Data

Jul. 15, 2020  (JP) .................... 2020-121424

(51) Int. Cl.
*H04W 76/10*    (2018.01)
*H04W 76/30*    (2018.01)

(52) U.S. Cl.
CPC ........... *H04W 76/10* (2018.02); *H04W 76/30* (2018.02)

(58) Field of Classification Search
CPC ............................ H04W 76/10; H04W 76/30
See application file for complete search history.

(56) References Cited

U.S. PATENT DOCUMENTS 10,375,618 B2 * 8/2019 Onishi ................ H04B 1/3822
11,589,198 B2 * 2/2023 Uchiyama .............. H04W 4/46
(Continued)

FOREIGN PATENT DOCUMENTS

JP        2005039571 A      2/2005
JP        2008288820 A     11/2008
(Continued)

OTHER PUBLICATIONS

IEEE Std 802.Nov. 2016 IEEE Standards Association, "IEEE Standard for Information technology—Telecommunications and information exchange between systems; Local and metropolitan area networks-Specific requirements; Part 11: Wireless LAN Medium Access Control (MAC) and Physical Layer (PHY) Specifications," IEEE Computer Society. (3534 pages).
(Continued)

*Primary Examiner* — Tuan H Nguyen
(74) *Attorney, Agent, or Firm* — Seed Intellectual Property Law Group LLP

(57) ABSTRACT

A communication apparatus mounted on a vehicle includes: a first communication circuit that operates as an access point of an infrastructure mode and transmits and receives a radio wave toward and from a front side of the vehicle; and a second communication circuit that operates as a station of an infrastructure mode and transmits and receives a radio wave toward and from the front side of the vehicle.

10 Claims, 14 Drawing Sheets

(56) References Cited

U.S. PATENT DOCUMENTS

| | | |
|---|---|---|
| 2005/0032535 A1 | 2/2005 | Shitama et al. |
| 2010/0097986 A1 | 4/2010 | Ylitalo et al. |
| 2016/0135115 A1 | 5/2016 | Patil et al. |
| 2017/0188296 A1 | 6/2017 | Fujikami et al. |
| 2017/0289896 A1 | 10/2017 | Onishi et al. |
| 2018/0234904 A1 | 8/2018 | Lee et al. |
| 2021/0266715 A1 | 8/2021 | Uchiyama et al. |
| 2022/0015004 A1 | 1/2022 | Nakano et al. |

FOREIGN PATENT DOCUMENTS

| | | | |
|---|---|---|---|
| JP | 2009048547 | * 3/2009 | ............ B60R 21/00 |
| JP | 2009048547 A | 3/2009 | |
| JP | 2010505306 A | 2/2010 | |
| JP | 2017184051 A | 10/2017 | |
| JP | 2017534215 A | 11/2017 | |
| JP | 2019149845 A | 9/2019 | |
| WO | WO 2016009481 A1 | 1/2016 | |
| WO | WO 2020008911 A1 | 1/2020 | |
| WO | WO 2020195356 A1 | 10/2020 | |

OTHER PUBLICATIONS

International Search Report, mailed Sep. 14, 2021, for corresponding International Application No. PCT/JP2021/025017. (7 pages).

* cited by examiner

COMMUNICATION APPARATUS AND COMMUNICATION METHOD

TECHNICAL FIELD

The present disclosure relates to a communication apparatus and a communication method.

BACKGROUND ART

Patent Literature (hereinafter, referred to as "PTL") 1 discloses a method in which a radio communication apparatus mounted on a vehicle switches between a plurality of modes such as a Station (STA) mode and an Access Point (AP) mode and communicates with another radio communication apparatus.

In Non-Patent Literature (hereinafter, referred to as "NPL") 1, a Personal Basic Service Set (PBSS) is specified as a method for communicating between terminals without a base station. In the PBSS, a PBSS Control Point (PCP) that performs a role of determining the scheduling is determined among one or more neighboring communicable terminals.

Incidentally, a traffic accident is likely to occur at a place such as an intersection. Thus, allowing communication for information, such as a video image of a camera, between vehicles entering an intersection may enhance safety at the intersection.

CITATION LIST

Patent Literature

PTL 1
WO2016/009481

Non-Patent Literature

NPL 1
IEEE802.11-2016

SUMMARY OF INVENTION

However, for communication between vehicles (hereinafter, may be referred to as "inter-vehicle communication") based on a PBSS, establishing a radio link between vehicles entering the intersection may be difficult.

Non-limiting and exemplary embodiments of the present disclosure facilitate providing a communication apparatus and a communication method each capable of easily establishing a radio link between vehicles entering an intersection.

A communication apparatus according to an embodiment of the present disclosure is a communication apparatus mounted on a vehicle, the communication apparatus including: a first communication circuit that operates as an access point of an infrastructure mode and transmits and receives a radio wave toward and from a front side of the vehicle; and a second communication circuit that operates as a station of an infrastructure mode and transmits and receives a radio wave toward and from the front side of the vehicle.

A communication method according to an embodiment of the present disclosure is a communication method for a communication apparatus mounted on a vehicle, the communication method including: performing, by a first communication circuit, an operation as an access point of an infrastructure mode; transmitting and receiving, by the first communication circuit, a radio wave toward and from a front side of the vehicle; performing, by a second communication circuit, an operation as a station of an infrastructure mode; and transmitting and receiving, by the second communication circuit, a radio wave toward and from the front side of the vehicle.

It should be noted that a general or specific embodiment may be implemented as a system, an apparatus, a method, an integrated circuit, a computer program, a storage medium, or any selective combination thereof.

According to an embodiment of the present disclosure, it is possible to easily establish a radio link between vehicles entering an intersection.

Additional benefits and advantages of embodiments of the present disclosure will become apparent from the specification and drawings. The benefits and/or advantages may be individually obtained by some embodiments and features described in the specification and drawings, which need not all be provided in order to obtain one or more of such features.

DESCRIPTION OF EMBODIMENTS

Hereinafter, embodiments of the present invention will be described in detail with reference to the drawings as appropriate. However, a detailed description more than necessary may be omitted, such as a detailed description of a well-known matter and a duplicate description for a substantially identical configuration, to avoid unnecessary redundancy of the following description and to facilitate understanding by a person skilled in the art.

Note that, the accompanying drawings and the following description are provided for a person skilled in the art to sufficiently understand the present disclosure, and are not intended to limit the subject matter described in the claims.

Embodiment 1

Figure 1:
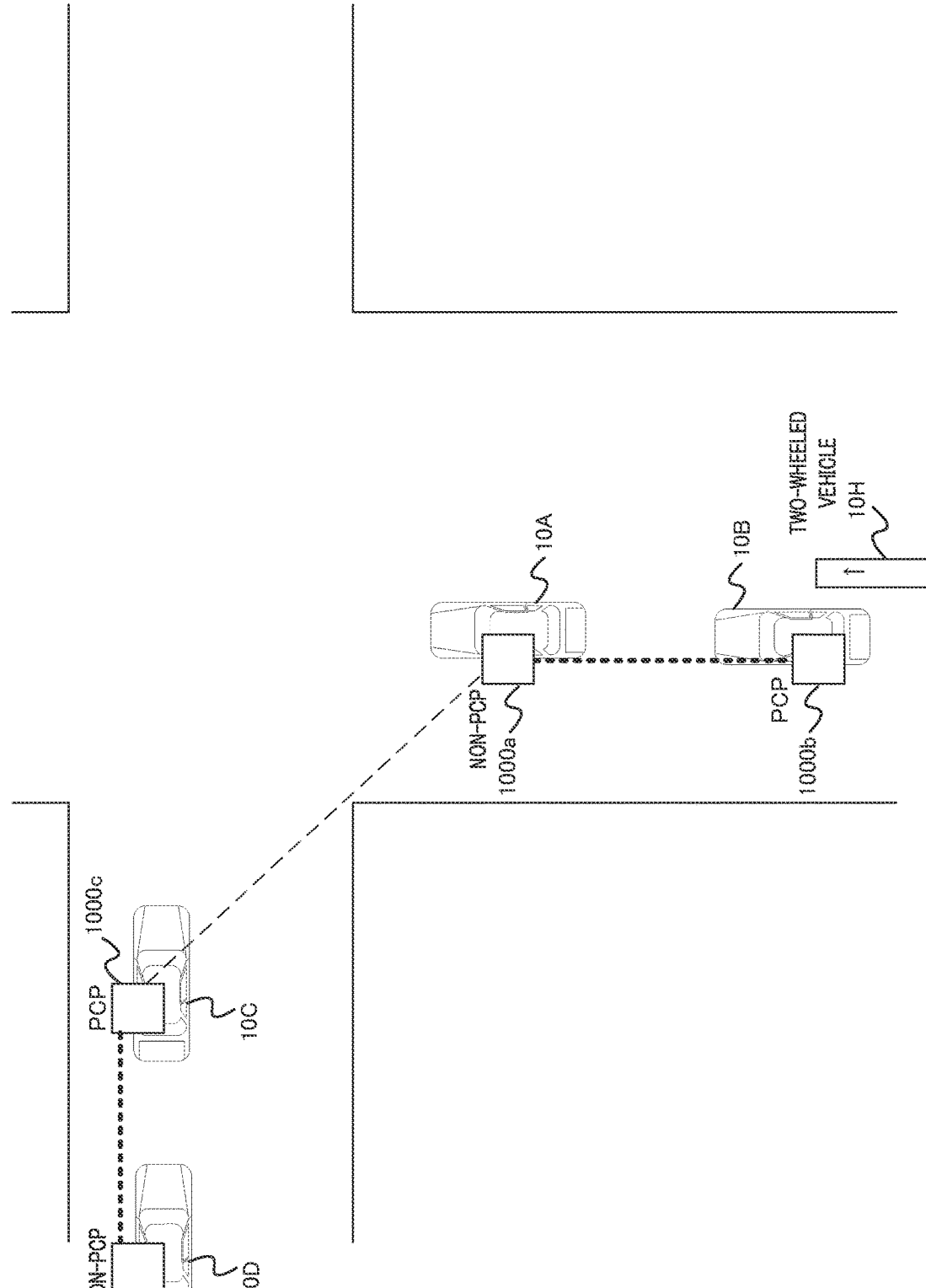
FIG. 1 illustrates exemplary inter-vehicle communication using a PBSS mode.

FIG. 1 illustrates exemplary inter-vehicle communication using a PBSS mode. FIG. 1 illustrates vehicles 10A, 10B, 10C, and 10D. Vehicles 10A, 10B, 10C, and 10D may be a vehicle that travels on a road or near a road, such as an automobile, a motorcycle, a bicycle, or a tram. Note that the following drawings are described in the case of a left-hand traffic, but the present disclosure can be applied to a right-hand traffic as well.

Vehicle 10A is equipped with communication apparatus 1000a. Vehicle 10B is equipped with communication apparatus 1000b. Vehicle 10C is equipped with communication apparatus 1000c. Vehicle 10D is equipped with communication apparatus 1000D.

Communication apparatuses 1000a to 1000d perform communication based on a PBSS mode. In the following description, communication performed between vehicles traveling in a back-and-forth relationship in the same traveling direction may be referred to as in-line inter-vehicle communication.

For example, vehicle 10A and vehicle 10B travel in the same traveling direction on the road. Communication apparatus 1000a and communication apparatus 1000b perform in-line inter-vehicle communication.

For example, communication apparatus 1000a finds (detects) communication apparatus 1000b, and establishes (connects) a radio link with communication apparatus 1000b based on a PBSS. Communication apparatus 1000a and communication apparatus 1000b determine either of the two apparatuses to be a PCP based on a method described in NPL 1. For example, communication apparatus 1000a and communication apparatus 1000b determine that communication apparatus 1000b is a PCP and communication apparatus 1000a is a non-PCP. In this case, non-PCP communication apparatus 1000a participates in a PBSS of PCP communication apparatus 1000b.

For example, vehicle 10C and vehicle 10D travel in the same traveling direction on the road. Communication apparatus 1000c and communication apparatus 1000d perform in-line inter-vehicle communication.

For example, communication apparatus 1000c finds (detects) communication apparatus 1000d, and establishes (connects) a radio link with communication apparatus 1000d based on a PBSS. Communication apparatus 1000c and communication apparatus 1000d determine either of the two apparatuses to be a PCP based on a method described in NPL 1. For example, communication apparatus 1000c and communication apparatus 1000d determine that communication apparatus 1000c is a PCP and communication apparatus 1000d is a non-PCP. In this case, non-PCP communication apparatus 1000d participates in a PBSS of PCP communication apparatus 1000c.

In this situation, at a place where vehicles cross each other, such as an intersection, performing inter-vehicle communication meeting each other may enhance safety. For example, transmitting a video image of a camera (not illustrated) mounted on vehicle 10C from communication apparatus 1000c to communication apparatus 1000a allows vehicle 10A to find a pedestrian (not illustrated) in a right-turn destination when turning right, which may result in enhancing safety at right-turn.

As an example of establishing communication at an intersection, communication apparatus 1000a of vehicle 10A entering the intersection finds communication apparatus 1000c of vehicle 10C entering the intersection. To initiate communication with the found communication apparatus 1000c, communication apparatus 1000a leaves (disconnects) from the PBSS of communication apparatus 1000b and participates in the PBSS of communication apparatus 1000c.

This allows communication apparatus 1000a of vehicle 10A to communicate with communication apparatus 1000c of vehicle 10C that communication apparatus 1000a meets at the intersection, and to receive the video image of the camera mounted on vehicle 10C. Further, non-PCP communication apparatus 1000d performing in-line inter-vehicle communication with PCP communication apparatus 1000c can communicate with communication apparatus 1000a by transmitting a relay request to communication apparatus 1000c.

However, communication apparatus 1000a does not perform in-line inter-vehicle communication with communication apparatus 1000b because communication apparatus 1000a has left from the PBSS of communication apparatus 1000b. Thus, it is difficult for vehicle 10A to find a vehicle approaching from the rear side, which may result in lowering the safety.

For example, when a camera (not illustrated) mounted on vehicle 10B finds two-wheeled vehicle 10H approaching from the rear side, communication apparatus 1000b does not need to transmit the video camera image of two-wheeled vehicle 10H to communication apparatus 1000a, and thus the safety of vehicle 10A when turning right is lowered.

Further, communication apparatus 1000a cancels communication with communication apparatus 1000b before establishing a radio link with communication apparatus 1000c, and after leaving from the PBSS of communication apparatus 1000b, communication apparatus 1000a executes a procedure for participating in the PBSS of communication apparatus 1000c. Thus, it takes a time to complete the establishment of the radio link between communication apparatus 1000a and communication apparatus 1000c, the initiation of the transmission of the video camera image of vehicle 10C to communication apparatus 1000a is delayed, and thus the safety of vehicle 10A when turning right is lowered.

Figure 2:
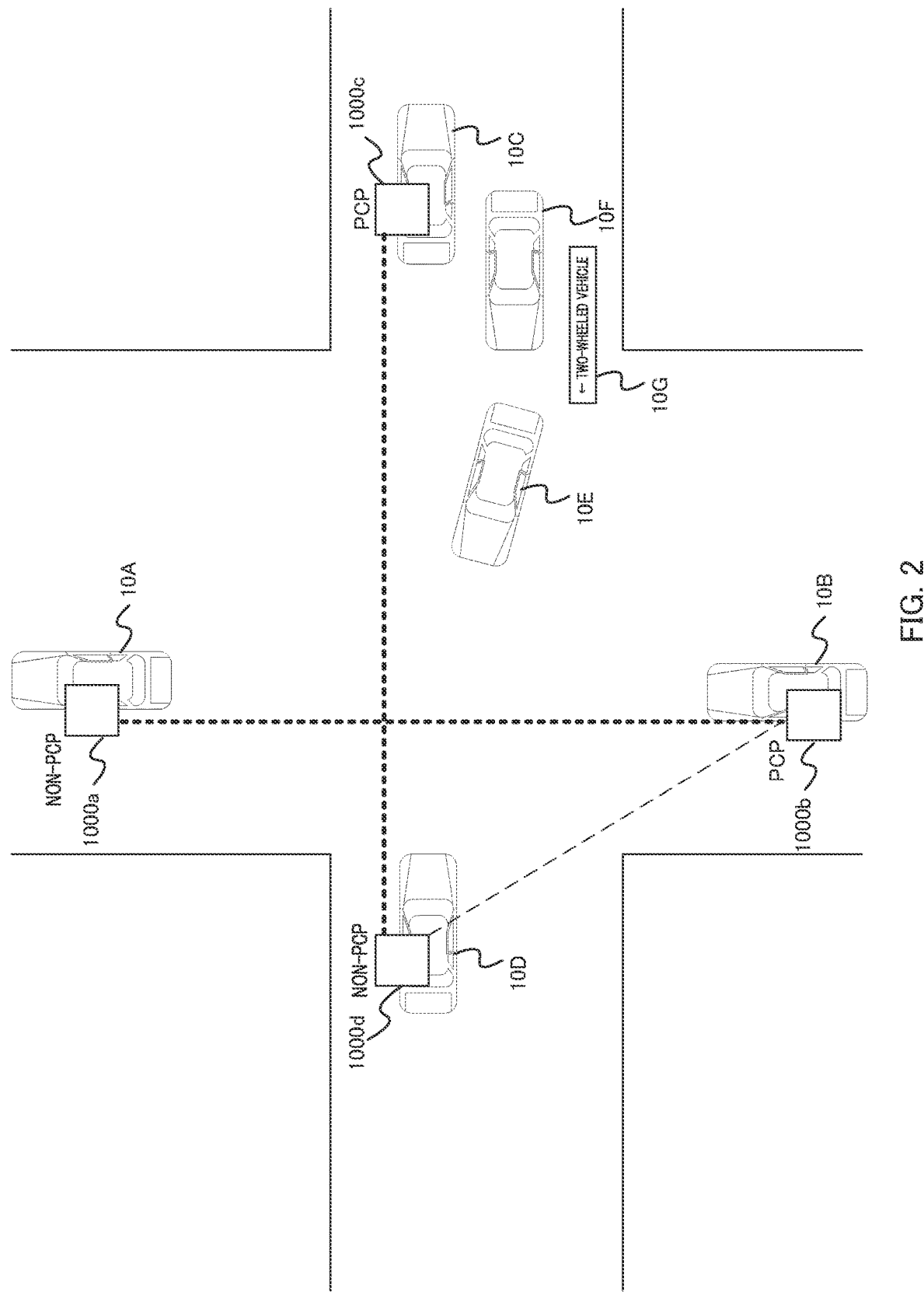
FIG. 2 illustrates another exemplary inter-vehicle communication using a PBSS mode.

FIG. 2 illustrates another exemplary inter-vehicle communication using a PBSS mode. In FIG. 2, the same components as those in FIG. 1 are denoted by the same reference numerals.

For example, vehicle 10A and vehicle 10B travel in the same traveling direction on the road. Communication apparatus 1000a and communication apparatus 1000b establish a radio link with each other based on a PBSS, and perform in-line inter-vehicle communication with each other. For example, communication apparatus 1000a determines a non-PCP and communication apparatus 1000b determines a PCP.

For example, vehicle 10C and vehicle 10D travel in the same traveling direction on the road. Communication apparatus 1000c and communication apparatus 1000d establish a radio link with each other based on a PBSS and perform in-line inter-vehicle communication with each other. For example, communication apparatus 1000c determines a PCP and communication apparatus 1000d determines a non-PCP In this case, when vehicle 10D enters an intersection and turns right after vehicle 10C passes the intersection, two-wheeled vehicle 10G on the oncoming lane is hidden behind vehicle 10E and thus is located at the blind area with respect to a driver of vehicle 10D.

Meanwhile, a sensor (not illustrated) such as radar or a camera mounted on vehicle 10B can detect two-wheeled vehicle 10G. When communication apparatus 1000b can notify information on two-wheeled vehicle 10G detected by the sensor of vehicle 10B to communication apparatus 1000d of vehicle 10D, the safety when vehicle 10D turns right can be enhanced.

However, because communication apparatus 1000d participates in the PBSS of communication apparatus 1000c, it takes a time to establish a radio link with communication apparatus 1000b. For example, because communication apparatus 1000d cancels communication with communication apparatus 1000c and executes a procedure for participating in the PBSS of communication apparatus 1000b after leaving from the PBSS of communication apparatus 1000c, it takes a time to establish a radio link with communication apparatus 1000b. When it takes a time to establish a radio link, the finding of a vehicle such as two-wheeled vehicle 10G approaching from the front side by vehicle 10D may be delayed, and thus the safety may be lowered.

A communication apparatus according to the present disclosure facilitates establishing a radio link between vehicles in radio communication between vehicles, for example, at a location such as an intersection.

Figure 3:
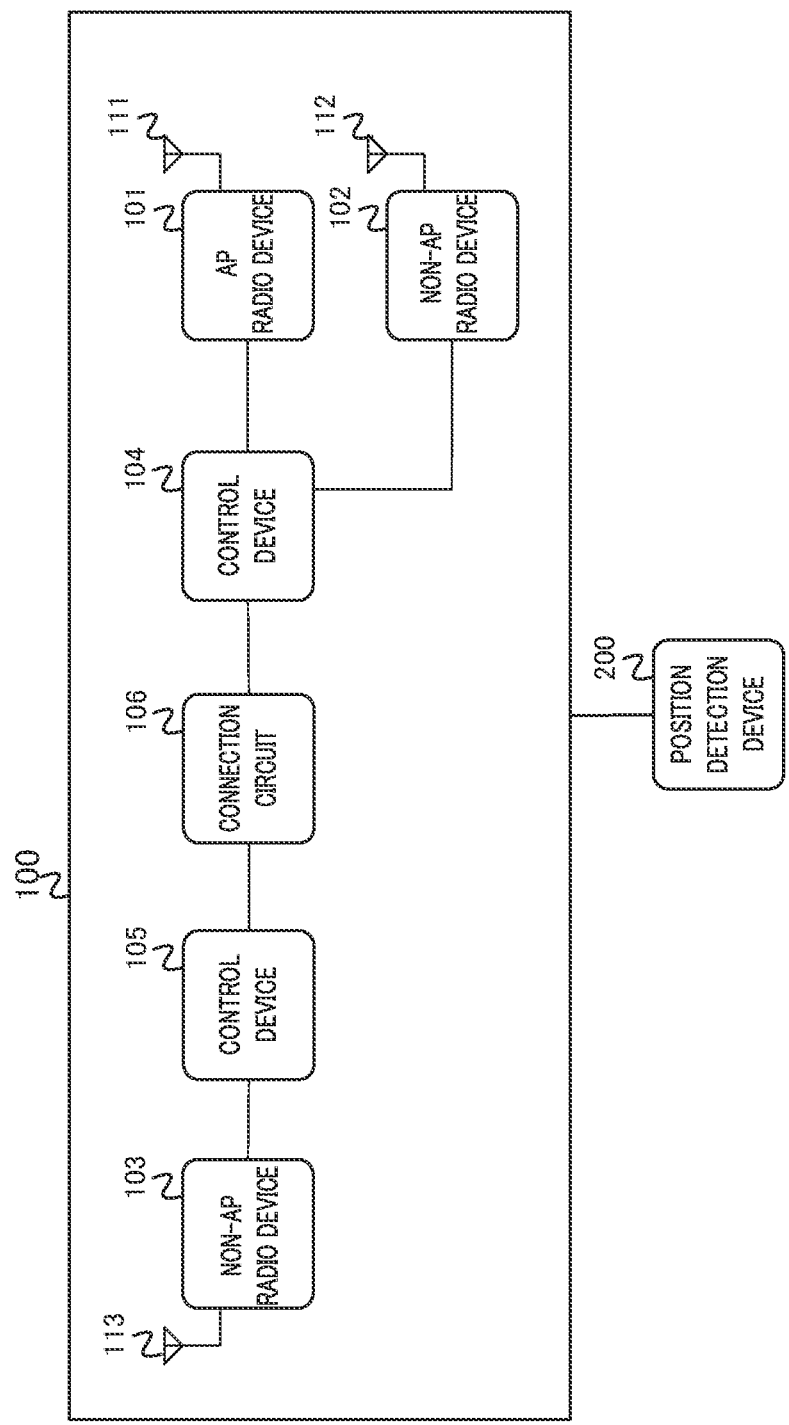
FIG. 3 is a block diagram illustrating an exemplary configuration of a communication apparatus according to Embodiment 1.

FIG. 3 is a block diagram illustrating an exemplary configuration of communication apparatus 100 according to Embodiment 1. As illustrated in FIG. 3, communication apparatus 100 includes: AP radio device 101; non-AP radio device 102; non-AP radio device 103; control devices 104 and 105; connection circuit 106; and antennae 111, 112, and 113.

Antennae 111 and 112 change directivity in a certain range on the front side of the vehicle. Antenna 113 changes directivity in a certain range on the rear side of the vehicle. Antennae 111, 112, and 113 may be array antennae or phased array antennae including a plurality of antenna elements.

AP radio device 101, non-AP radio device 102, and AP radio device 103 operate in an infrastructure mode compliant with the standards of IEEE802.11 series. The infrastructure mode may be referred to as an infrastructure BSS mode.

AP radio device 101 operates based on an AP mode. Antenna 111 is connected to AP radio device 101, and AP radio device 101 performs communication in a certain range on the front side of the vehicle. AP radio device 101 performs communication using, for example, a millimeter wave.

Non-AP radio device 102 operates based on a non-AP mode. Antenna 112 is connected to non-AP radio device 102, and non-AP radio device 102 performs communication in a certain range on the front side of the vehicle. Non-AP radio device 102 performs communication using, for example, a millimeter wave.

Non-AP radio device 103 operates based on a non-AP mode. Antenna 113 is connected to non-AP radio device 103, and non-AP radio device 103 performs communication in a certain range on the front side of the vehicle. Non-AP radio device 103 performs communication using, for example, a millimeter wave.

Note that the AP may be referred to as a base station or a parent unit. The non-AP may be referred to as a STA, a terminal, a client, or a child unit.

AP radio device 101 and non-AP radio device 102 may be physically separated from each other. Further, AP radio device 101 and non-AP radio device 102 may be physically one radio device, and one radio device may have functions of AP radio device 101 and non-AP radio device 102.

Non-AP radio devices 102 and 103 may be physically separated from each other. Further, non-AP radio devices 102 and 103 may be physically one radio device, and one radio device may have functions of non-AP radio devices 102 and 103.

Control devices 104 and 105 perform routing control in a subnet (BSS) in which AP radio device 101, non-AP radio device 102, and non-AP radio device 103 participate. Further, control device 104 determines a network address of a BSS serviced by AP radio device 101. Control devices 104 and 105 may be configured by a processor such as a Central Processing Unit (CPU) or a Digital Signal Processor (DSP).

Control device 104 is connected to AP radio device 101 and non-AP radio device 102 via an interface such as Universal Serial Bus (USB), Peripheral Component Interconnect Express (PCIe), or Ethernet. Control device 105 is connected to non-AP radio device 103 via an interface such as USB, PCIe or Ethernet.

Control device 104 and control device 105 are connected to connection circuit 106 via an interface such as Ethernet or Controller Area Network (CAN). Connection circuit 106 connects control device 104 and control device 105 with each other. Connection circuit 106 may be a device or a circuit such as a hub, a switch, a router, a wire harness, or a switch box. Further, connection circuit 106 may be an access point, a child unit, a USB dongle, or an extension-board based on a radio communication system such as wireless Local Area Network (LAN), Wireless Gigabit (WiGig), or Bluetooth.

Note that position detection device 200 that detects a position of a vehicle equipped with communication apparatus 100 is connected to communication apparatus 100. Position detection device 200 may detect the position of the vehicle by a navigation system using a Global Navigation Satellite System (GNSS). Position detection device 200 may be incorporated in communication apparatus 100. Further, communication apparatus 100 may be carried by a pedestrian (not illustrated).

Figure 4:
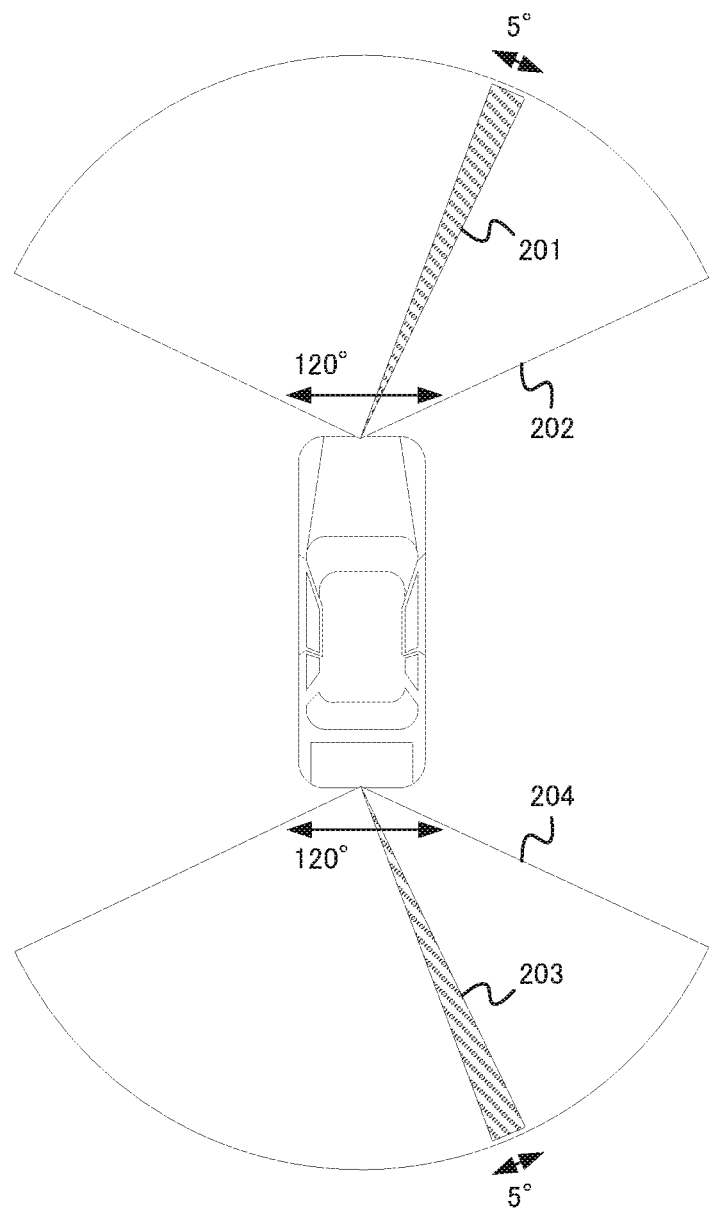
FIG. 4 illustrates exemplary directivity of antennae.

FIG. 4 illustrates exemplary directivity of antennae 111, 112, and 113. Antennae 111 and 112 radiating radio waves on the front side of the vehicle may have directivity of, for example, a half-value angle of 5° as illustrated by sector 201. As an example, antennae 111 and 112 may change the direction of the directivity (beam or sector) in a range of 120° in the front direction of the vehicle (60° on each of the left and right sides with respect to the front surface of the vehicle) as illustrated by sector 202.

For example, antenna 113 radiating a radio wave to the rear side of the vehicle may have directivity of a half-value angle of 5° as illustrated by sector 203. For example, antenna 113 may change the direction of the directivity in a range of 120° on the rear side of the vehicle (60° on each of the left and right sides with respect to the rear surface of the vehicle) as illustrated by sector 204.

Note that the movable ranges of the directions of the directivity indicated by sectors 202 and 204 are not limited to 120°. The movable ranges of the directions of the directivity may be 90° or 180°. In millimeter wave communications, multiple antenna elements are placed on a board or a module to form a compact array antenna having high directivity. Thus, the communication range of one antenna module is often within 180°.

Figure 5:
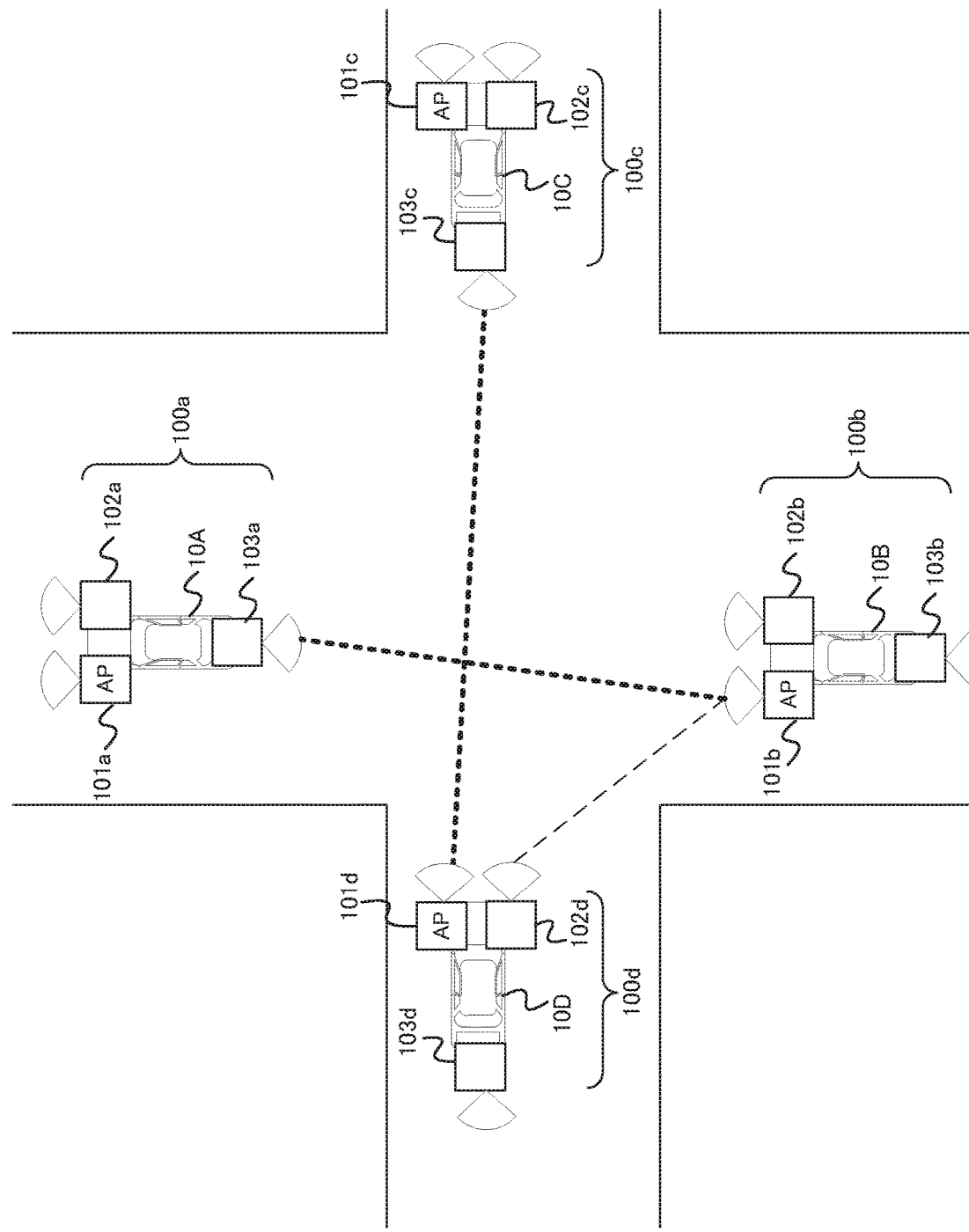
FIG. 5 illustrates exemplary inter-vehicle communication according to Embodiment 1.

FIG. 5 illustrates exemplary inter-vehicle communication according to Embodiment 1. Vehicles 10A, 10B, 10C, and 10D illustrated in FIG. 5 are each equipped with communication apparatus 100 illustrated in FIG. 3.

In the following description, in order to distinguish communication apparatus 100 mounted on vehicles 10A, 10B, 10C, and 10D, a communication apparatus mounted on vehicle 10A may be referred to as communication apparatus 100a, a communication apparatus mounted on vehicle 10B may be referred to as communication apparatus 100b, a communication apparatus mounted on vehicle 10C may be referred to as communication apparatus 100c, and a communication apparatus mounted on vehicle 10D may be referred to as communication apparatus 100d.

Further, in order to distinguish each unit included in each of communication apparatuses 100a, 100b, 100c, and 100d, the reference numerals of the units included in communication apparatuses 100a, 100b, 100c, and 100d may be denoted with suffixes of a, b, c, and d, respectively. For example, AP radio device 101 of communication apparatus 100a may be referred to as AP radio device 101a. AP radio device 101 of communication apparatus 100b may be referred to as AP radio device 101b.

For example, vehicle 10A and vehicle 10B travel in the same traveling direction on the road. Non-AP radio device 103a of vehicle 10A connects to (establishes a radio link) to AP radio device 101b of following vehicle 10B, and performs in-line inter-vehicle communication. For example, non-AP radio device 103a of vehicle 10A and AP radio device 101b of vehicle 10B performs AP to non-AP communication with each other using a distribution service described in NPL 1. Thus, communication apparatus 100a of vehicle 10A and communication apparatus 100b of vehicle 10B perform data communication with each other based on an Internet Protocol (IP).

Note that communication apparatus 100 does not perform communication between non-AP radio devices. In other words, communication apparatus 100 does not perform communication between terminals (between non-AP radio device 102 and non-AP radio device 103).

Further, AP radio device 101 transmits a beacon frame, and non-AP radio device 103 transmit no beacon frame. As a result, communication apparatus 100 can reduce the total number of beacon frames, and thus enhances throughput of the data communication due to interference between the communication apparatuses and occupation of the radio band. The beacon frame may be referred to as a beacon signal.

Further, AP radio device 101 may provide one BSS service and configure one subnet (a unit of a local area network in IP communication).

In addition, control device 104 may have a server function of Dynamic Host Configuration Protocol (DHCP). For example, when non-AP radio device 103 connects to AP radio device 101, control device 104 may assign one of IP addresses belonging to the subnet of AP radio device 101 to non-AP radio device 103.

For example, vehicle 10C and vehicle 10D, for example, travel in the same traveling direction on the road. Non-AP radio device 103c of vehicle 10C and AP radio device 101d of following vehicle 10D also perform in-line inter-vehicle communication with each other as well as above-described non-AP radio device 103a of vehicle 10A and AP radio device 101b of vehicle 10B.

At this time, non-AP radio device 102d of vehicle 10D enters the intersection while scanning a beacon frame. Non-AP radio device 102d of vehicle 10D finds AP radio device 101b of vehicle 10B, which is an AP, and connects to AP radio device 101b. Note that AP radio device 101b of vehicle 10B can establish a radio link with a plurality of non-APs (non-AP radio device 103a of vehicle 10A and non-AP radio device 102d of vehicle 10D).

This allows communication apparatus 100d of vehicle 10D to communicate with communication apparatus 100b of vehicle 10B via non-AP radio device 102d without disconnecting the radio link (disconnecting in-line inter-vehicle communication) with communication apparatus 100c of vehicle 10C. Further, communication apparatus 100d of vehicle 10D can communicate with communication apparatus 100a of vehicle 10A via communication apparatus 100b (AP radio device 101b) of vehicle 10B.

Control device 104d of vehicle 10D can operate as a router. For example, control device 104d of vehicle 10D may perform routing between a subnet corresponding to a BSS of AP radio device 101d and a subnet corresponding to a BSS of radio device 101b of vehicle 10B, which is the connection destination of non-AP radio device 102d.

This allows communication apparatus 100c of vehicle 10C to communicate with communication apparatus 100b of vehicle 10B via communication apparatus 100d (router) of vehicle 10D. Further, communication apparatus 100c of vehicle 10C can communicate with communication apparatus 100a of vehicle 10A via communication apparatus 100b of vehicle 10B. In other words, communication apparatus 100c of vehicle 10C can be connected to a network of in-line inter-vehicle communication different from the in-line inter-vehicle communication with communication apparatus 100d of following vehicle 10D.

Note that control device 104 may determine a communication path (routing path) using a routing protocol such as Routing Information Protocol (RIP), Open Shortest Path First (OSPF), or Border Gateway Protocol (BGP).

Control device 104 may also perform routing between AP radio device 101 and non-AP radio device 103. Control device 104 may perform routing between non-AP radio device 102 and non-AP radio device 103.

In addition, communication apparatus 100 may configure a mesh network using an existing routing protocol in the infrastructure mode.

Moreover, control device 104 may randomly set the network address of the subnet that AP radio device 101 uses. For example, control device 104 may randomly select one network address among network addresses of 10.0.0.0/28, 10.0.0.16/28, 10.0.0.32/28, . . . , 10.0.0.240/28, . . . , 10.0.1.0/28, . . . , 10.0.0.240/28, . . . , 10.0.255.0/28, . . . , 10.1.0.0/28, . . . , 10.255.0.0/28, . . . , 10.255.255.0/28, . . . , 10.255.255.240/28 (256×256×16 ways).

Thus, it is possible to reduce the probability that the network address of the subnet of AP radio device 101 overlaps with the network address of the subnet to which non-AP radio devices 102 and 103 are connected. Further, it is possible to reduce the probability that the network address of the subnet of AP radio device 101 overlaps with the network address of the subnet connected by the routing between non-AP radio devices 102 and 103 and control device 104 of another vehicle. Communication between a large number of vehicles can be achieved via the routing between AP radio device 101, non-AP radio device 102, and non-AP radio device 103 mounted on vehicle 10.

Further, when the network addresses of AP radio device 101 and non-AP radio devices 102 and 103 overlap with each other, control device 104 may perform bridging instead of routing. When the network addresses of AP radio device 101 and non-AP radio devices 102 and 103 overlap with each other and the subnet mask is different from each other, control device 104 may connect the subnet based on Proxy ARP (ARP: Address Resolution Protocol). Control device 104 may select one of routing, bridging, or Proxy ARP depending on whether the network addresses of AP radio device 101 (AP) and non-AP radio devices 102 and 103 overlap with each other, and/or whether the subnet masks match with each other.

In addition, control device 104 may use the site-local address of IPv6 (IP version 6) to configure a subnet for each BSS. Further, control device 104 may use a unique IPv6 network address predetermined for each AP radio device 101.

Furthermore, when non-AP radio device 102 of a first vehicle is connected to AP radio device 101 of a second vehicle, non-AP radio device 102 of the first vehicle may notify information on AP radio device 101 of the first vehicle, such as BSS Identifier (BSSID), MAC address, and Service Set Identifier (SSID), to AP radio device 101 of the second vehicle. Non-AP radio device 102 of the second vehicle may receive the information on AP radio device 101 of the first vehicle from AP radio device 101 of the second vehicle, and may exclude AP radio device 101 of the first vehicle from the connection target.

For example, in FIG. 5, non-AP radio device 102d of vehicle 10D connects to AP radio device 101b of vehicle 10B. Non-AP radio device 102d of vehicle 10D notifies the SSID of AP radio device 101d of vehicle 10D to AP radio device 101b of vehicle 10B. Non-AP radio device 102b of vehicle 10B excludes the SSID of AP radio device 101d of vehicle 10D received by AP radio device 101b from the scanning target and the association target. Further, non-AP radio device 102b of vehicle 10B may exclude the BSSID of AP radio device 101d of vehicle 10D from the scanning target and the association target.

Figure 6:
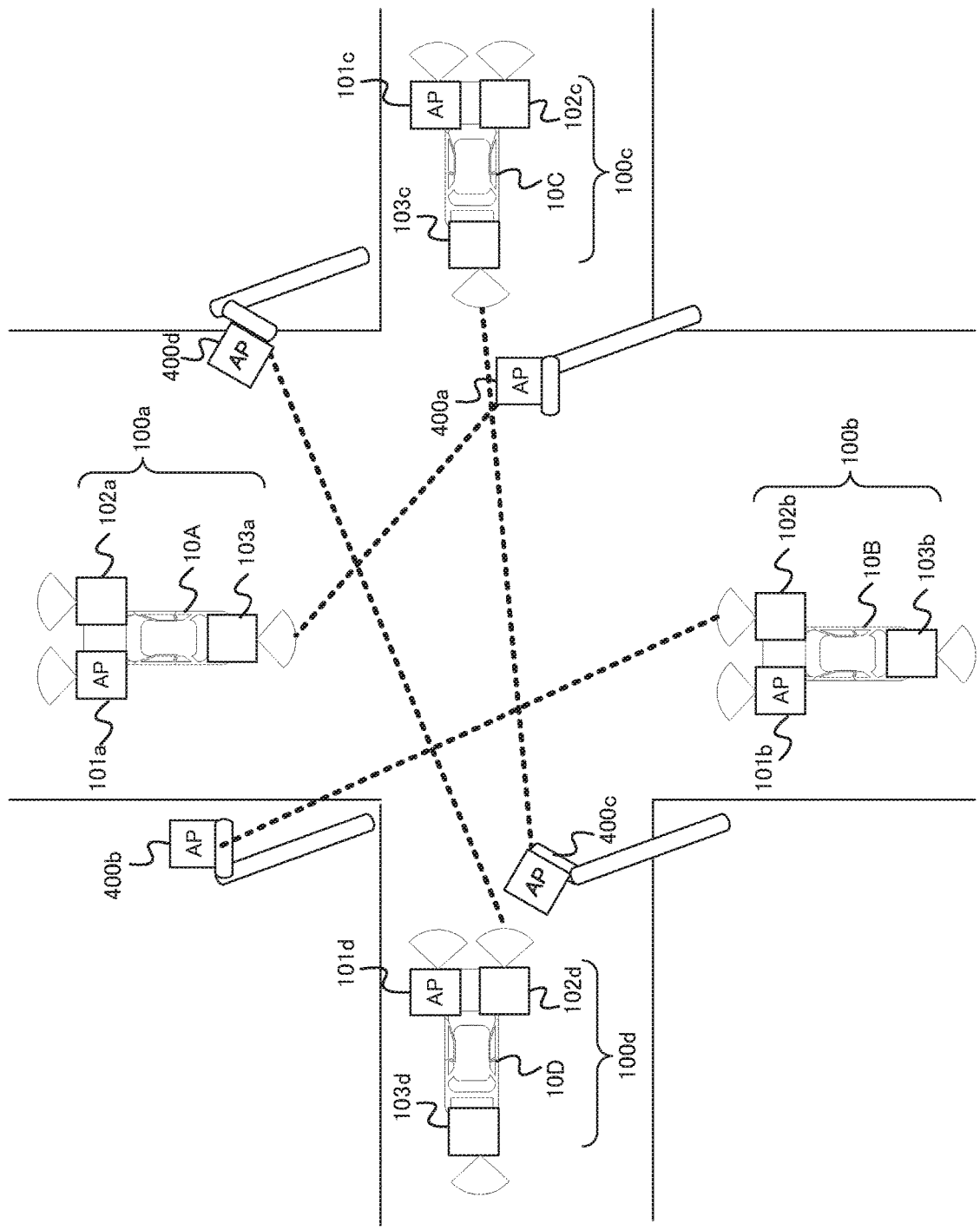
FIG. 6 illustrates another exemplary inter-vehicle communication according to Embodiment 1.

FIG. 6 illustrates another exemplary inter-vehicle communication according to Embodiment 1. In FIG. 6, the same components as those in FIG. 5 are denoted by the same reference numerals.

In FIG. 6, roadside devices 400a, 400b, 400c, and 400d are installed at the intersection. Roadside devices 400a, 400b, 400c, and 400d are APs that operate based on an infrastructure mode. Roadside devices 400a, 400b, 400c, and 400d are connected to each other by a backhaul line (not illustrated) and relay communication between non-AP radio devices by relaying, bridging, or routing. The backhaul line may be configured by wire or by radio. In the following description, when not distinguished from each other, roadside devices 400a, 400b, 400c, and 400d may be described as roadside device 400.

When non-AP radio devices 102a, 102b, 102c, and 102d connect to roadside devices 400a, 400b, 400c, and 400d, intercommunication between non-AP radio devices 102a, 102b, 102c, and 102d is possible.

As an example, non-AP radio device 102b of vehicle 10B entering the intersection and non-AP radio device 102d of vehicle 10D entering the intersection connect to roadside device 400. Non-AP radio device 102b of vehicle 10B and non-AP radio device 102d of vehicle 10D communicate with each other via roadside device 400.

In a case where no connection is made to roadside device 400 when the vehicle enters the intersection, non-AP radio device 102 of communication apparatus 100 may start scanning AP radio device 101. That is, in a case where a radio link with roadside device 400 has been established when the vehicle enters the intersection, communication device 100 may not execute the establishment process of a radio link described in FIG. 5. In other words, non-AP radio device 102 may give higher priority to establishment of a radio link with the roadside device than establishment of a radio link with the AP radio device of the vehicle.

Note that, when non-AP radio device 102x (not illustrated) of vehicle X (not illustrated) following vehicle 10B does not connect to roadside device 400 (e.g., when non-AP radio device 102x is outside the communication area of roadside device 400), non-AP radio device 103b of vehicle 10B may connect to AP radio device 101 of the following vehicle X. Then, non-AP radio devices 102b and 103b of vehicle 10B may perform routing.

This allows non-AP radio device 102x of vehicle X following vehicle 10B to communicate with roadside device 400 via communication apparatus 100b of vehicle 10B even when non-AP radio device 102x of vehicle X is outside the radio communication range of roadside device 400. That is, communication apparatus 100b of vehicle 10B expands the communication area of roadside device 400.

Figure 7:
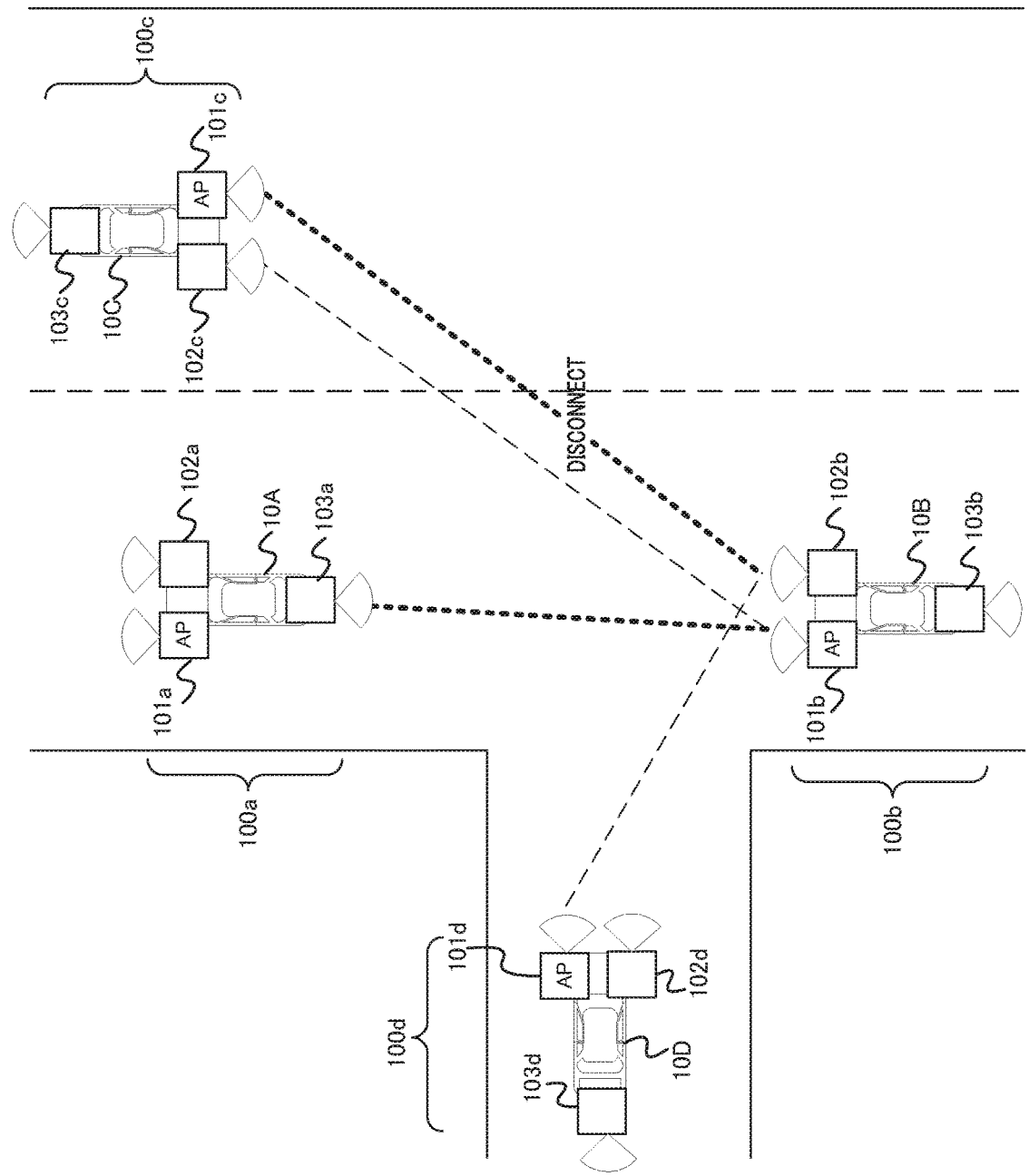
FIG. 7 illustrates still another exemplary inter-vehicle communication according to Embodiment 1.

FIG. 7 illustrates still another exemplary inter-vehicle communication according to Embodiment 1. In FIG. 7, the same components as those in FIG. 5 are denoted by the same reference numerals. In FIG. 7, vehicle 10C travels on the oncoming lane of the lane on which vehicles 10A and 10B travels.

It is assumed that non-AP radio device 103a of vehicle 10A perform in-line inter-vehicle communication with AP radio device 101b of following vehicle 10B. It is assumed that non-AP radio device 102b of vehicle 10B communicates with AP radio device 101c of vehicle 10C traveling on the oncoming lane. It is assumed that non-AP radio device 102c of vehicle 10C does not establish a radio link with AP radio device 101 of another vehicle 10. It is assumed that AP radio device 101d and non-AP radio device 102d of vehicle 10D do not establish a radio link with AP radio device 101 and non-AP radio device 103 of another vehicle 10.

In a case where non-AP radio device 102 has established a radio link with AP radio device 101 of another vehicle 10 before vehicle 10 enters the intersection, non-AP radio device 102 may disconnect the radio link with AP radio device 101 of another vehicle 10.

For example, non-AP radio device 102b of vehicle 10B illustrated in FIG. 7 has established a radio link with AP radio 101c of vehicle 10C traveling on the oncoming lane. Non-AP radio device 102b of vehicle 10B may disconnect the radio link with AP radio device 101c of vehicle 10C before entering the intersection.

Non-AP radio device 102b of vehicle 10B that has disconnected the radio link with AP radio device 101c of vehicle 10C starts scanning beacon frames. Non-AP radio device 102b of vehicle 10B finds AP radio device 101c of vehicle 10C and AP radio device 101d of vehicle 10D based on the scanning of beacon frames.

Non-AP radio device 102b of vehicle 10B establishes a radio link with AP radio device 101 having the better radio quality of a beacon frame of the found AP radio devices 101c and 101d. Note that the radio quality may be Received Signal Strength Indicator (RSSI).

In this case, vehicle 10C is an oncoming vehicle for vehicle 10B and travels in the opposite direction with respect to vehicle 10B. Vehicle 10D travels in a lateral direction with respect to the traveling direction of vehicle 10B. Thus, the relative speed between vehicle 10B and vehicle 10C is faster than the relative speed between vehicle 10B and vehicle 10D, and the radio quality of AP radio device 101d of vehicle 10D is better than that of AP radio device 101c of vehicle 10C. Therefore, of the found AP radio devices 101c and 101d, non-AP radio device 102b of vehicle 10B establishes a radio link with AP radio device 101d of vehicle 10D.

That is, non-AP radio device 102b of vehicle 10B establishes a radio link with AP radio device 101d of vehicle 10D which non-AP radio device 102b of vehicle 10B meets at the intersection (meets for the first time at the intersection). In other words, non-AP radio device 102b of vehicle 10B disconnects the radio link with AP radio device 101c of vehicle 10C traveling the oncoming lane, and gives priority to establishment of a radio link with AP radio device 101d of vehicle 10D entering the intersection from a road different from the road on which vehicle 10B travels.

Note that non-AP radio device 102c of vehicle 10C that has not established any radio link finds AP radio device 101b of vehicle 10B and AP radio device 101d of vehicle 10D. Further, non-AP radio device 102d of vehicle 10D that has not established any radio link finds AP radio device 101b of vehicle 10B and AP radio device 101c of vehicle 10C.

Non-AP radio device 102d of vehicle 10D may connect to AP radio device 101c of vehicle 10C of the found AP radio device 101b of vehicle 10B and AP radio device 101c of vehicle 10C. This is because non-AP radio device 102b of vehicle 10B and AP radio device 101d of vehicle 10D has established a radio link with each other. Non-AP radio device 102d of vehicle 10D may notify the BSSID of AP radio device 101d to AP radio device 101c of vehicle 10C that has established the radio link with non-AP radio device 102d.

When obtaining BSSID of AP radio device 101d of vehicle 10D, non-AP radio device 102c of vehicle 10C may not connect to AP radio device 101d of vehicle 10D, and may connect to AP radio device 101b of vehicle 10B.

Further, when non-AP radio device 102c of vehicle 10C is communicable with communication apparatus 100b of vehicle 10B by the routing of communication apparatus 100d of vehicle 10D, non-AP radio device 102c of vehicle 10C may not connect to AP radio device 101b of vehicle 10B. Non-AP radio device 102c of vehicle 10C may connect to an AP radio device (not illustrated) of a preceding vehicle traveling in front of vehicle 10C.

Figure 8:
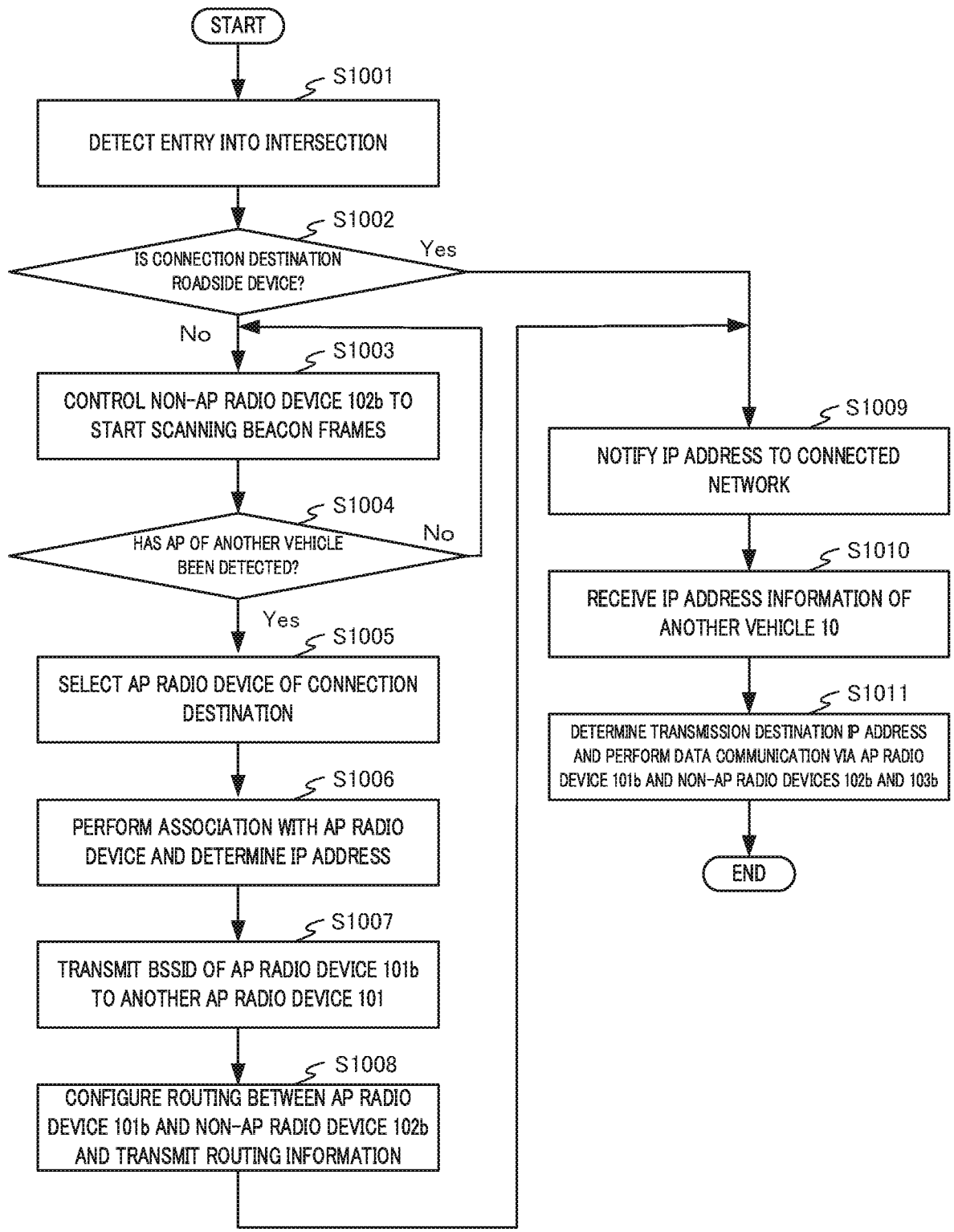
FIG. 8 is a flow chart illustrating an exemplary operation of inter-vehicle communication according to Embodiment 1.

FIG. 8 is a flow chart illustrating an exemplary operation of inter-vehicle communication according to Embodiment 1. FIG. 8 illustrates an exemplary operation of communication apparatus 100b mounted on vehicle 10B. Communication apparatus 100b periodically executes the processing of a flow chart illustrated in FIG. 8.

Control device 104b detects the (expected) entry of vehicle 10B into the intersection based on the position detection of position detection device 200b (S1001). For example, control device 104b detects that vehicle 10B enters a predetermined area including the intersection (e.g., in a circle having a radius of 50m with the intersection being centered) based on the current position of vehicle 10B detected by position detection device 200b and the map information.

Note that control device 104b may detect the entry of vehicle 10B into the intersection using ON of the direction indicator as a trigger.

Control device 104b determines whether the connection destination of non-AP radio device 102b is roadside device 400 (S1002). When determining that the connection destination of non-AP radio device 102b is roadside device 400 ("Yes" in S1002), control device 104b proceeds the process to S1009.

When determining that the connection destination of non-AP radio device 102b is not roadside device 400 ("No" in S1002), control device 104b controls non-AP radio device 102b and starts scanning beacon frames (S1003).

Note that, in a case where non-AP radio device 102b connects to AP radio device 101 of another vehicle 10 before starting scanning beacon frames in S1003, control device 104b can disconnect the communication with AP radio device 101 of another vehicle 10. In other words, control device 104b may set non-AP radio device 102b that is to be connected to AP radio device 101 of another vehicle 10 to be temporality free (a state in which non-AP radio device 102b does not connect to any AP radio device 101) on the front side of vehicle 10B. Thus, non-AP radio device 102b of vehicle 10B, for example, disconnects the communication with AP radio device 101c of vehicle 10C traveling on the oncoming lane, and can connect to AP radio device 101d of vehicle 10D (vehicle 10D that vehicle B meets at the intersection) entering from another road different from the road on which vehicle 10B travels.

Control device 104b determines whether AP radio device 101 of another vehicle 10 has been detected based on the starting of the scanning of beacon frames in S1003 (S1004).

When control device 104b does not detect AP radio device 101 of another vehicle 10 ("No" in S1004), the process shifts to S1003.

When detecting AP radio device 101 of another vehicle 10 ("Yes" in S1004), control device 104b selects AP radio device 101 of the connection destination (S1005). For example, control device 104b selects AP radio device 101 with the best radio quality of the beacon frame.

Control device 104b performs association with AP radio device 101 selected in S1005 and determines an IP address (S1006).

Control device 104b transmits a BSSID of AP radio device 101b to AP radio device 101 on which association is performed in S1006 via non-AP radio device 102b (S1007). Note that control device 104b may determine an IP address based on DHCP when performing communication based on IPv4. Control device 104b may determine an IP address based on StateLess Address Auto Configuration (SLAAC) or DHCPv6 when performing communication based on IPv6.

Control device 104b configures routing between AP radio device 101b and non-AP radio device 102b, and transmits the configured routing information via AP radio device 101b (S1008).

Control device 104b notifies the IP address of the network in which the radio link has been established to the connected network via AP radio device 101b (S1009).

Note that control device 104b may find AP radio device 101 of another vehicle 10 by using, for example, multicast Domain Name System (mDNS) or Bonjour in the processes of S1008 and S1009.

Further, control device 104b may inform an IP address and service information using mDNS or Bonjour. The service information may include, for example, application information such as collision avoidance information, route information, a dynamic map, and an Internet connection gateway. In addition, the service information may include protocol information such as Message Queuing Telemetry Transport (MQTT), Web Socket, or a Robot OS (ROS) message.

Control device 104b receives IP address information of communication apparatus 100 of another vehicle 10 via AP radio device 101b and non-AP radio device 102b (S1010).

Control device 104b determines a transmission destination IP address and performs data communication via AP radio device 101b and non-AP radio devices 102b and 103b (S1011). Note that control device 104b may broadcast or multicast the data to the routed subnet.

As described above, communication apparatus 100 includes AP radio device 101 and antenna 111 that operate as an AP of an infrastructure mode and transmit and receive a radio wave toward and from the front side of vehicle 10, and includes non-AP radio device 102 and antenna 112 that operate as a station of an infrastructure mode and transmit and receive a radio wave toward and from the front side of vehicle 10. Thus, communication apparatus 100 can easily establish a radio link at the place such as an intersection where roads intersect with each other.

For example, while AP radio device 101 maintains in-line inter-vehicle communication with the communication apparatus of vehicle 10 traveling ahead, communication apparatus 100 can further establish communication with the communication apparatus of the vehicle entering the intersection by non-AP radio device 102. That is, communication apparatus 100 can easily establish communication with the communication device of the vehicle entering the intersection by non-AP radio device 102 without performing the disconnection of the in-line inter-vehicle communication of AP radio device 101.

In addition, control device 104 controls non-AP radio device 102 to select AP radio device 101 with good radio quality (AP radio device 101 of the vehicle having a small relative speed). A radio link with vehicle 10 having a small relative speed has a low risk to be early disconnected, and thus communication apparatus 100 can perform a large number of data communications.

In addition, because communication apparatus 100 includes two radio devices of AP radio device 101 and non-AP radio device 102 communicating on the front side of vehicle 10, in-line inter-vehicle communication with low delay can be achieved.

In addition, even in a mobility environment in which the position and direction of vehicle 10 change from moment to moment, communication apparatus 100 can form a mesh network using millimeter-wave communication having directivity, and can communicate with a large number of vehicles.

Note that position detection device 200 may detect the entry of a vehicle into the intersection using ADAS. The ADAS may detect the entry of vehicle 10 into the intersection with at least one sensor such as a camera, Light Detection and Ranging, Laser Imaging Detection and Ranging (LiDAR), or radar, for example.

Further, control device 104 executes the process of S1002 when detecting the entry of the vehicle into the intersection in S1001 in FIG. 8, but the present disclosure is not limited thereto. Control device 104 may execute the process of S1002 when a blind area exists in a predetermined angle (e.g., 120°) on the front side of vehicle 10 based on Advanced driver-assistance systems (ADAS). The blind area on the front side of the vehicle may be detected by a sensor such as a camera, LiDAR, or radar.

In addition, communication apparatus 100 may transmit a list of network addresses or routing information using a radio system different from a radio system that AP radio device 101 and non-AP radio devices 102 and 103 use. For example, communication apparatus 100 may transmit a list of network addresses or routing information by a radio system such as Dedicated Short Range Communications (DSRC), Long Term Evolution (LTE)—Vehicle-to-Everything (V2X), or Wi-Fi.

Furthermore, communication apparatus 100 illustrated in FIG. 3 includes two control devices 104 and 105 and connection circuit 106, but is not limited thereto. Communication apparatus 100 may include one control device.

Figure 9:
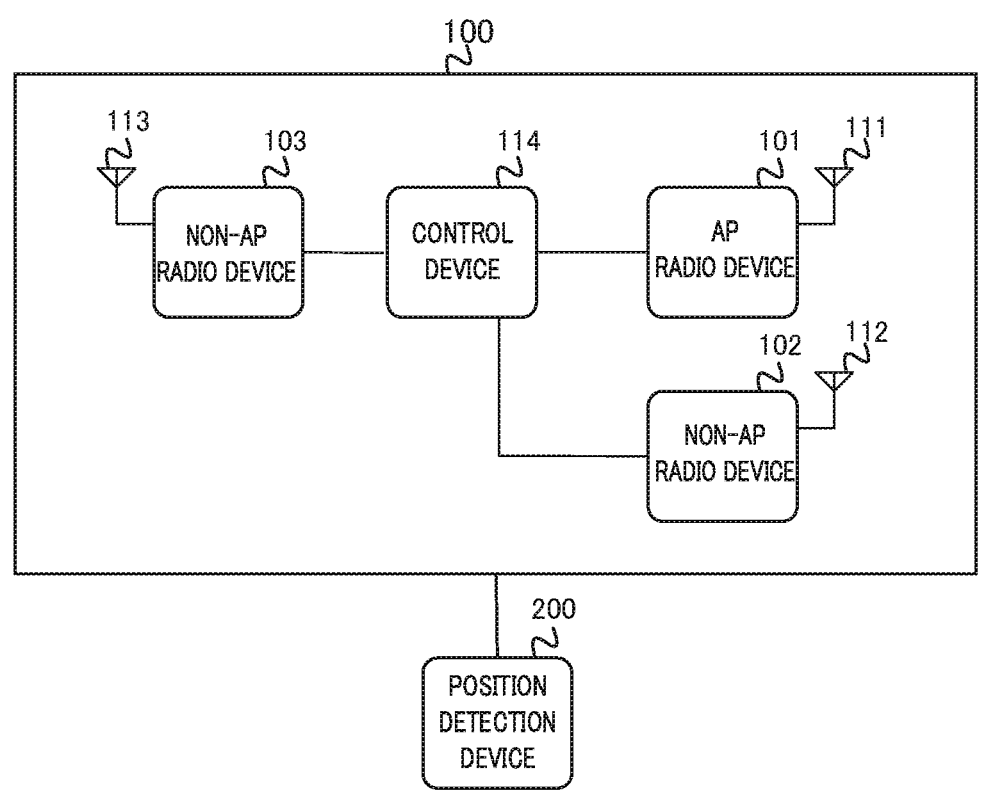
FIG. 9 is a block diagram illustrating another exemplary configuration of a communication apparatus.

FIG. 9 is another block diagram illustrating an exemplary configuration of communication apparatus 100. In FIG. 9, the same components as those in FIG. 3 are denoted by the same reference numerals. As illustrated in FIG. 9, communication apparatus 100 includes one control device 114.

Control device 114 performs routing control between subnets (BSS) in which AP radio device 101, non-AP radio device 102, and non-AP radio device 103 participate. Further, control device 114 determines a network address of BSS serviced by AP radio device 101. Control device 114 may be configured by a processor such as a CPU or a DSP, for example.

Embodiment 2

In Embodiment 1, control device 104 selects AP radio device 101 with the best radio quality when detecting AP radio device 101 of another vehicle 10. In Embodiment 2, control device 104 selects AP radio device 101 having a large increase in the number of communicable subnets. In other words, control device 104 excludes AP radio device 101 that has been already reachable by routing. In the following description, portions different from those of Embodiment 1 will be described.

Figure 10A:
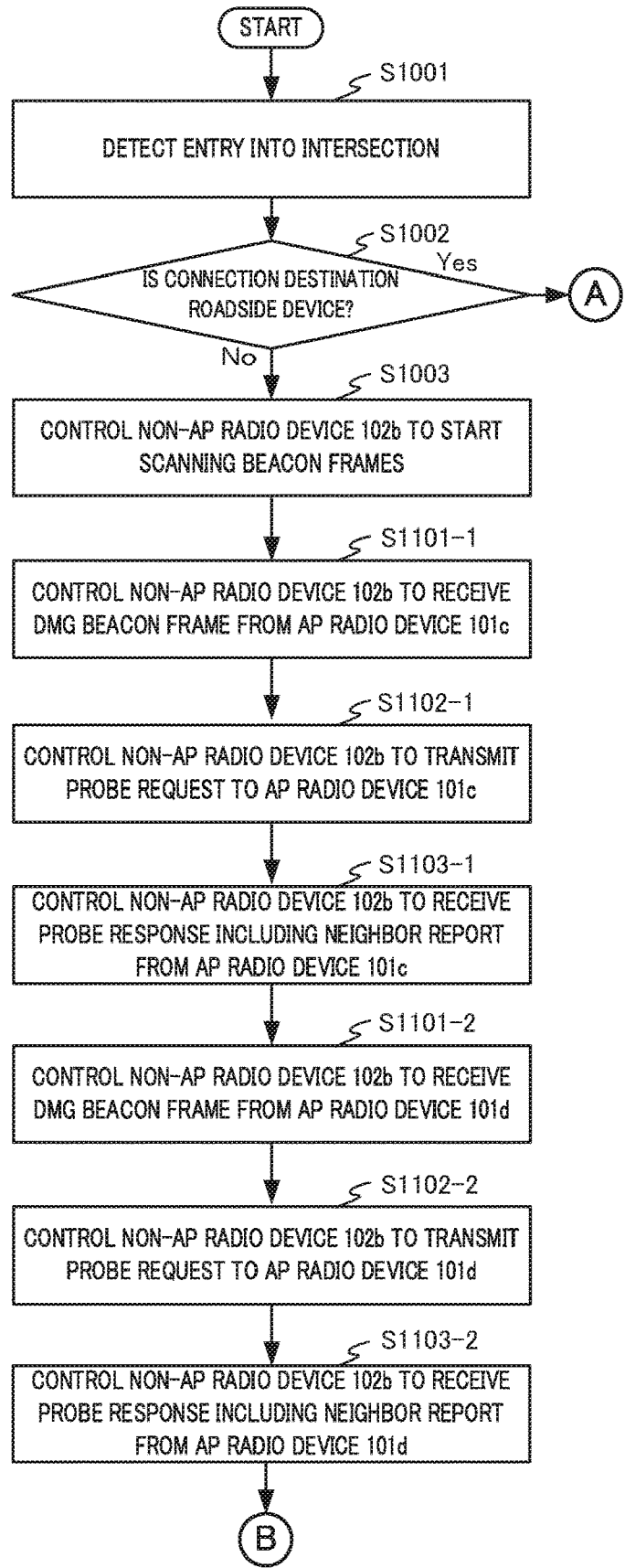
FIG. 10A is a flow chart illustrating an exemplary operation of inter-vehicle communication according to Embodiment 2.
Figure 10B:
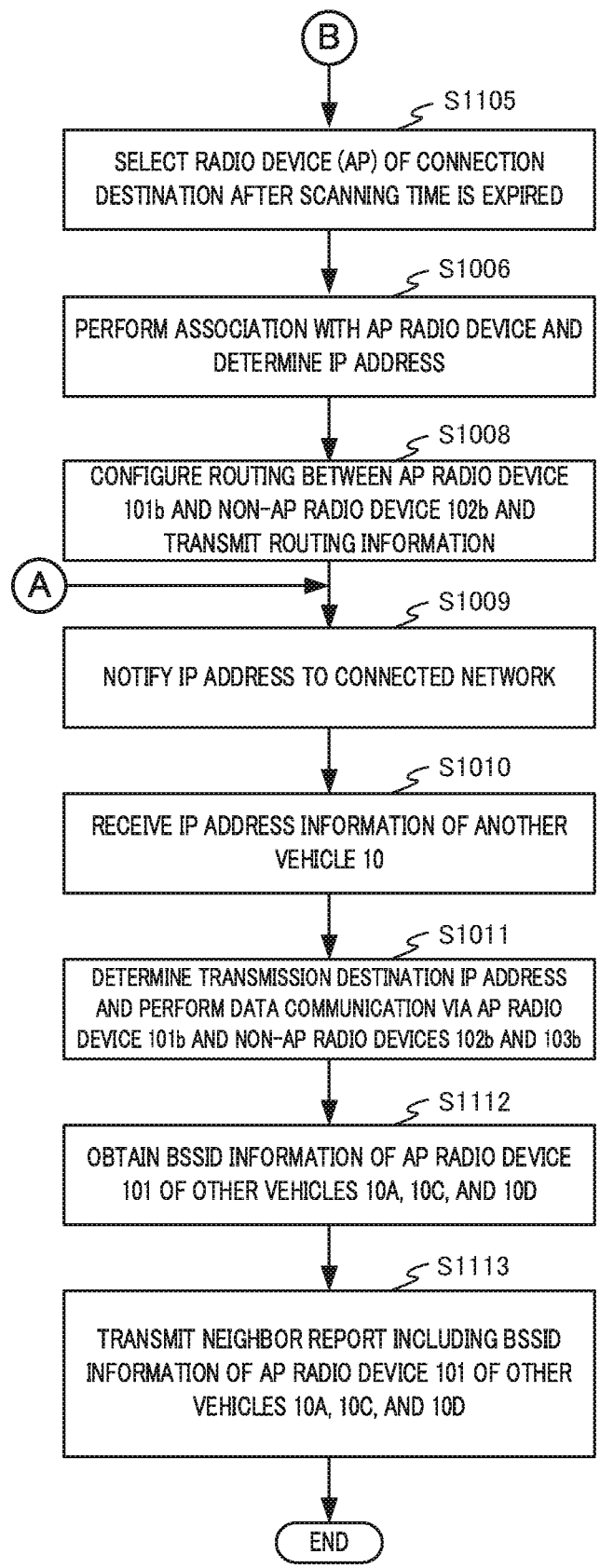
FIG. 10B is another flow chart illustrating an exemplary operation of inter-vehicle communication according to Embodiment 2.

FIGS. 10A and 10B are flow charts illustrating an exemplary operation of inter-vehicle communication according to Embodiment 2. Circled A and B illustrated in FIG. 10A lead to circled A and B illustrated in FIG. 10B. In FIGS. 10A and 10B, the same processes as those described in FIG. 8 are denoted by the same reference numerals, and the description thereof is omitted. For example, communication apparatus 100b periodically executes the processing of the flow chart illustrated in FIGS. 10A and 10B.

Control device 104b controls non-AP radio device 102b to receive a Directional Multi Gigabit (DMG) beacon frame transmitted from AP radio device 101c of vehicle 10C (S1101-1).

After receiving the DMG beacon frame, control device 104b controls non-AP radio device 102b to transmit a probe request to AP radio device 101c of vehicle 10C (S1102-1).

Control device 104b controls non-AP radio device 102b to receive a probe response including a neighbor report from AP radio device 101c of vehicle 10C (S1103-1). The neighbor report, which will be described later, is information on AP radio device 101 of another communication apparatus 100 connectable directly or by routing (e.g., multi-hop) (e.g., a list of BSSIDs of connectable AP radio devices 101).

Control device 104b controls non-AP radio device 102b to receive a DMG beacon frame transmitted from AP radio device 101d of vehicle 10D (S1101-2).

After receiving the DMG beacon frame, control device 104b controls non-AP radio device 102b to transmit a probe request to AP radio device 101d of vehicle 10D (S1102-2).

Control device 104b controls non-AP radio device 102b to receive a probe response including a neighbor report from AP radio device 101d of vehicle 10D (S1103-2).

Control device 104b selects AP radio device 101 of the connection destination after the scanning time of the beacon frame is expired (S1105).

For example, control device 104b selects either AP radio device 101c of vehicle 10C from which the DMG beacon frame has been received in S1101-1 or AP radio device 101d of vehicle 10D from which the DMG beacon frame has been received in S1101-2.

At this time, when control device 104b performs association with AP radio device 101c, control device 104b can communicate with AP radio device 101c and AP radio device 101 whose BSSID is on the list received in S1103-1. Thus, from the list received in S1103-1, control device 104b can obtain the number of connectable subnets in the case of performing association with AP radio device 101c. Similarly, from the list received in S1103-2, control device 104b can obtain the number of connectable subnets in the case of performing association with AP radio device 101d.

Control device 104b obtains the number of BSSIDs currently communicable (the number of connectable subnets) in S1112, which will be described later. Control device 104b compares the number of BSSIDs obtained in S1112 (e.g., obtained in the previous flow chart processing) and the number of communicable subnets obtained in S1103-1 in the case of connecting to AP radio device 101c. Control device 104b compares the number of BSSIDs obtained in S1112 and the number of communicable subnets obtained in S1103-2 in the case of connecting to AP radio device 101d. Control device 104b selects AP radio device 101c or AP radio device 101d whichever having a large increase (the increased number is the largest) in the number of subnets to be newly connectable (the number of AP radio devices to be newly connectable).

Control device 104b controls AP radio device 101b to obtain a list of AP radio devices 101 connectable directly or by routing (a list of BSSIDs) from communication apparatuses 100a, 100c, and 100d of vehicle 10A, 10C, and 10D (S1112).

When obtaining a list of BSSIDs in S1112, control device 104b transmits a probe response including a neighbor report (S1113). The neighbor report includes a list of BSSIDs obtained in S1112. The neighbor report may be transmitted, for example, using a probe response.

Figure 11:
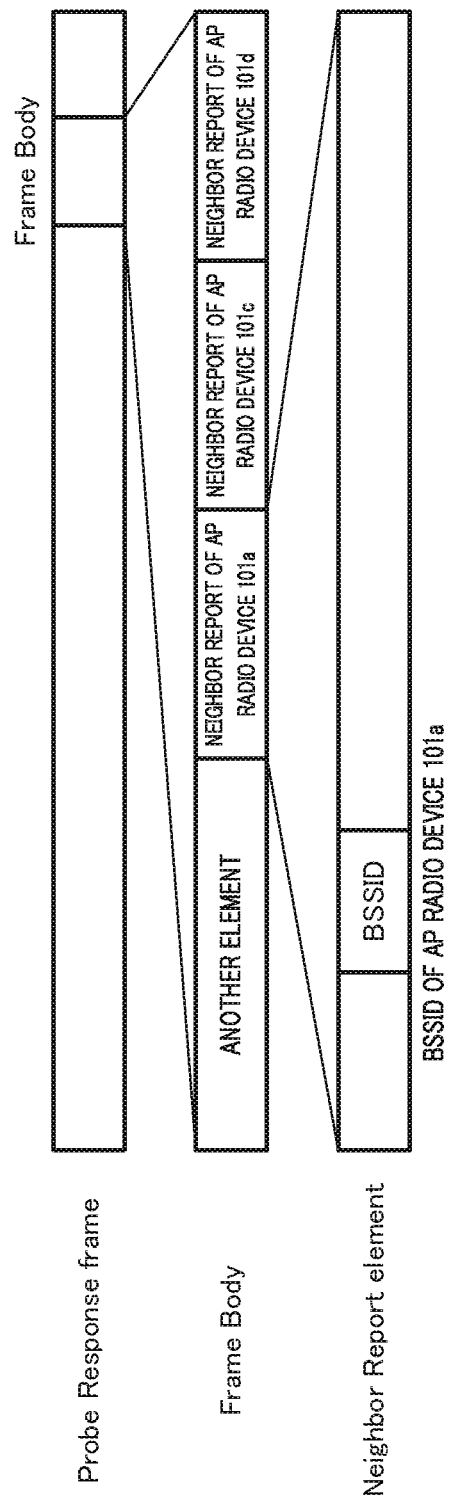
FIG. 11 illustrates an exemplary probe response frame.

FIG. 11 illustrates an exemplary probe response frame. FIG. 11 illustrates a probe response frame (probe response signal) that AP radio device 101b of vehicle 10B transmits. Descriptions of blank field elements illustrated in FIG. 11 is omitted. As illustrated in FIG. 11, a probe response includes a frame body field.

The frame body field includes an element of a neighbor report. In the example of FIG. 11, the frame body field includes elements of the neighbor reports of AP radio devices 101a, 101c, and 101d. The neighbor reports of AP radio devices 101a, 101c, and 101d includes BSSIDs of AP radio devices 101a, 101c, and 101d, respectively.

As described above, control device 104 may select an AP radio device to which non-AP radio device 102 connects based on the increase number of subnets. Thus, communication apparatus 100 can establish a radio link with an AP radio device of another vehicle entering the intersection.

Further, when AP radio device 101 transmits routing information in advance, non-AP radio device 102b can perform a routing setting with low delay after starting the connection process.

Note that, when the routing passes to the Internet (the routing passes to the roadside device, resulting in the routing passing to the Internet), control device 104 may select non-AP radio device 102 having a small hop count to the roadside device (or Intelligent Transport Systems (ITS) server), which is a gateway of the Internet. AP radio device 101 may notify the hop count using the neighbor report of the probe response.

In addition, for example, when entering the intersection, control device 104 may obtain the relative speed of another vehicle, and may select AP radio device 101 of the vehicle whose obtained relative speed is smaller than a predetermined threshold. The relative speed of the vehicle may be obtained using a beacon frame or a probe response frame. Further, information on absolute speed and an azimuth angle of the vehicle may be notified by another communication system, and the relative speed of the vehicle may be obtained (calculated) from the notified information.

Furthermore, control device 104 may connect to AP radio device 101 having a large relative speed, disconnect the connection after performing a predetermined amount of communication, and connect to another AP radio device.

Embodiment 3

In Embodiments 1 and 2, AP radio device 101 perform communication on the front side of the vehicle. In Embodiment 3, AP radio device also communicates on the rear side of the vehicle.

Figure 12:
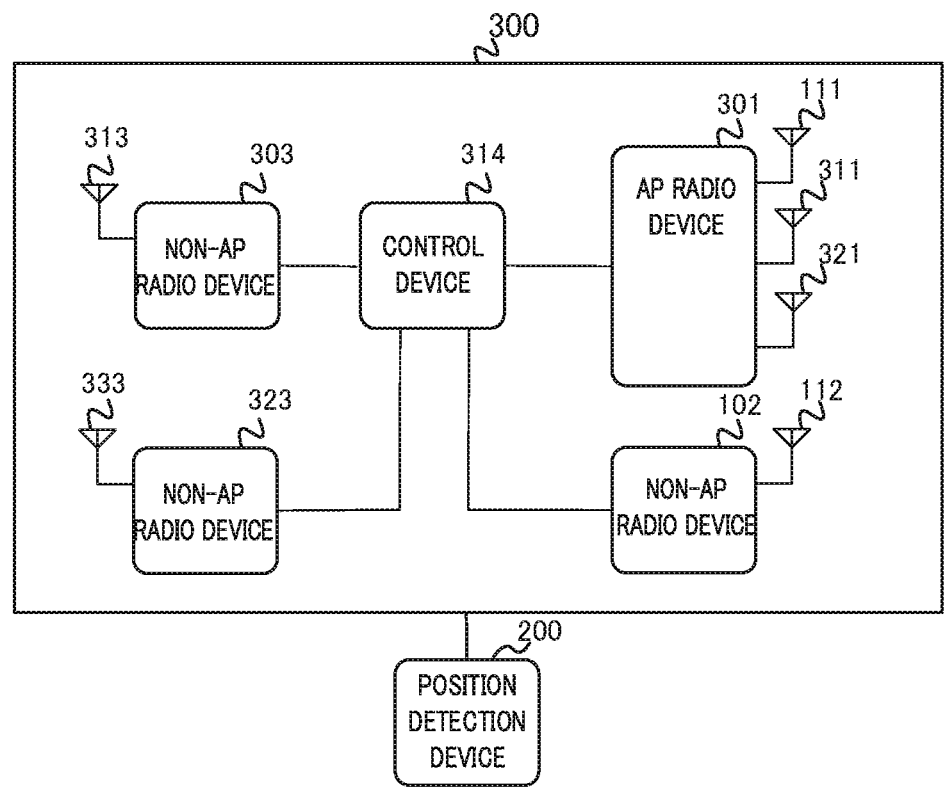
FIG. 12 illustrates a block diagram illustrating an exemplary configuration of a communication apparatus according to Embodiment 3.

FIG. 12 illustrates a block diagram illustrating an exemplary configuration of communication apparatus 300 according to Embodiment 3. As illustrated in FIG. 12, communication apparatus 300 includes AP radio device 301, non-AP radio devices 102, 303, and 323, control device 314, and antennae 111, 311, 321, 112, 313, and 333. Position detection device 200 is connected to communication apparatus 300.

Antennae 111, 311, and 321 are connected to AP radio device 301. Antennae 112, 313, and 333 are connected to non-AP radio device 102, 303, 323, respectively.

Control device 314 perform routing control of a subnet (BSS) in which AP radio device 301 and non-AP radio devices 102, 303, and 323 participate. Further, control device 314 determines the network address of the BSS serviced by AP radio device 301. Control device 314 may be configured by a processor such as a CPU or a DSP, for example.

Note that communication apparatus 300 may include a plurality of control devices. For example, the plurality of control devices may be provided one each for AP radio device 301 and non-AP radio devices 102, 303, and 323. The plurality of control devices may be connected by connection circuit 106 described in FIG. 3.

Further, non-AP radio devices 102, 303, and 323 may be physically separated from each other. In addition, non-AP radio devices 102, 303, and 323 may be physically one radio device, and one radio device may have functions of non-AP radio devices 102, 303, and 323.

Moreover, AP radio device 301 and non-AP radio devices 102, 303, and 323 may be physically separated from each other. AP radio device 301 and non-AP radio devices 102, 303, and 323 may be physically one radio device, and one radio device may have functions of AP radio device 101 and non-AP radio devices 102, 303, and 323.

Figure 13:
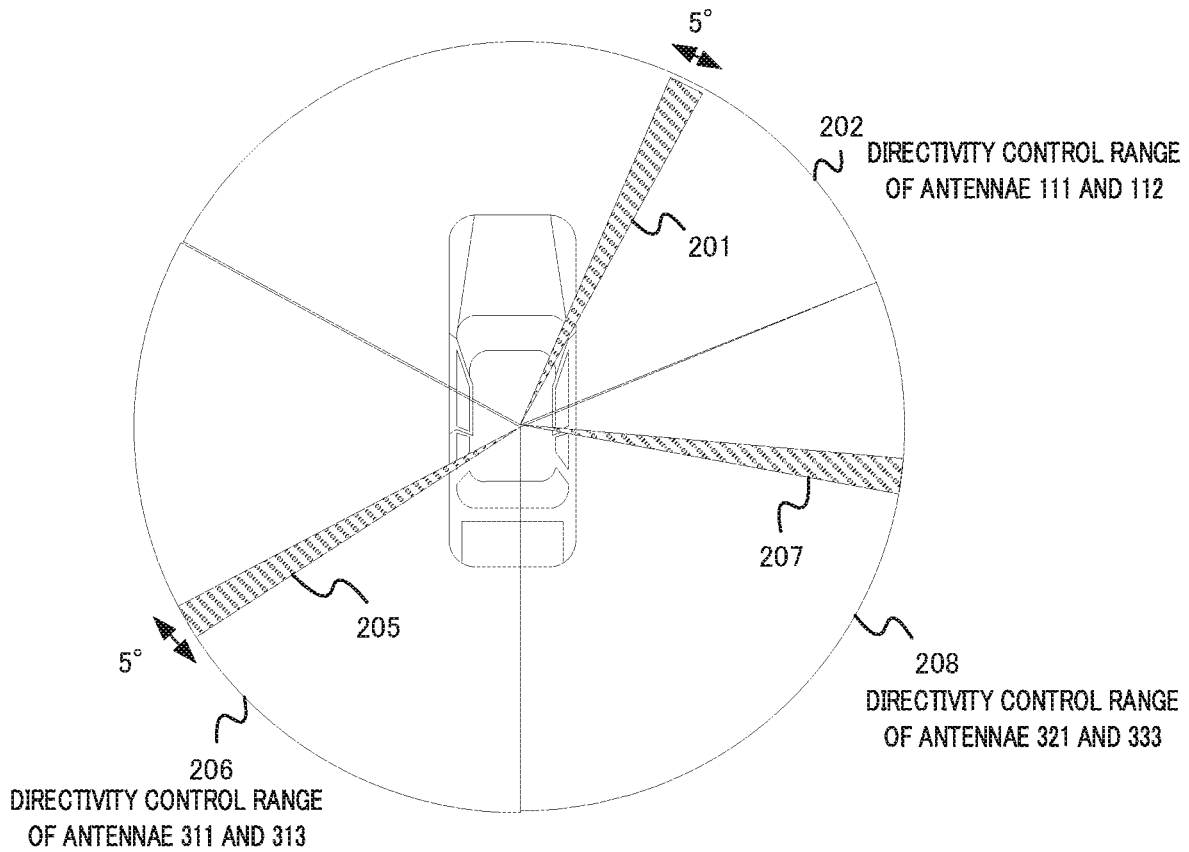
FIG. 13 illustrates exemplary directivity of antennae.

FIG. 13 illustrates exemplary directivity of antennae 111, 112, 311, 313, 321, and 333. Antennae 111 and 112 that radiate radio waves on the front side of the vehicle may have, for example, directivity of a half-value angle of 5° as illustrated by sector 201. Antennae 111 and 112 may change the direction of the directivity, for example, in a range of 120° in the front direction of the vehicle (60° on each of the left and right sides with respect to the front surface of the vehicle) as illustrated by sector 202.

Antenna 311 connected to AP radio device 301 and antenna 313 connected to non-AP radio device 303 may have directivity of a half-value angle of 5°, as illustrated by sector 205. Antennae 311 and 313 may change the direction of the directivity, for example, in a range of 120° in the left rear direction of the vehicle as illustrated by sector 206.

Antenna 321 connected to AP radio device 301 and antenna 333 connected to non-AP radio device 323 may have directivity of a half-value angle of 5°, as illustrated by sector 207. Antennae 321 and 333 may change the direction of the directivity, for example, in a range of 120° in the right rear direction of the vehicle as illustrated by sector 208.

AP radio device 301 communicates with a vehicle (non-AP radio device) in the surrounding 360° of vehicle 10 by switching or simultaneously using antennae 111, 311, and 321. Further, communication apparatus 300 includes non-AP radio devices 102, 303, and 323 to which antennae 112, 313, 333 are connected, respectively, and thus communication apparatus 300 communicates with a vehicle (AP radio device) in the surrounding 360° of vehicle 10. Communication apparatus 300 communicates with at least one communication apparatus (AP radio device) in each of sectors 202, 206, and 208 illustrated in FIG. 13.

Note that antennae 111, 112, 311, 313, 321, and 333 may cover an angular range of 120° or more (e.g., 140°) and may overlap with each other in the covering range.

Further, for example, four antennae may be connected to AP radio device 301, and each antenna may cover an angular range of 90° at a corresponding one of four corners of vehicle 10. Communication apparatus 300 may include four non-AP radio devices, and each non-AP radio device may cover an angular range of 90° at a corresponding one of four corners of vehicle 10.

Figure 14:
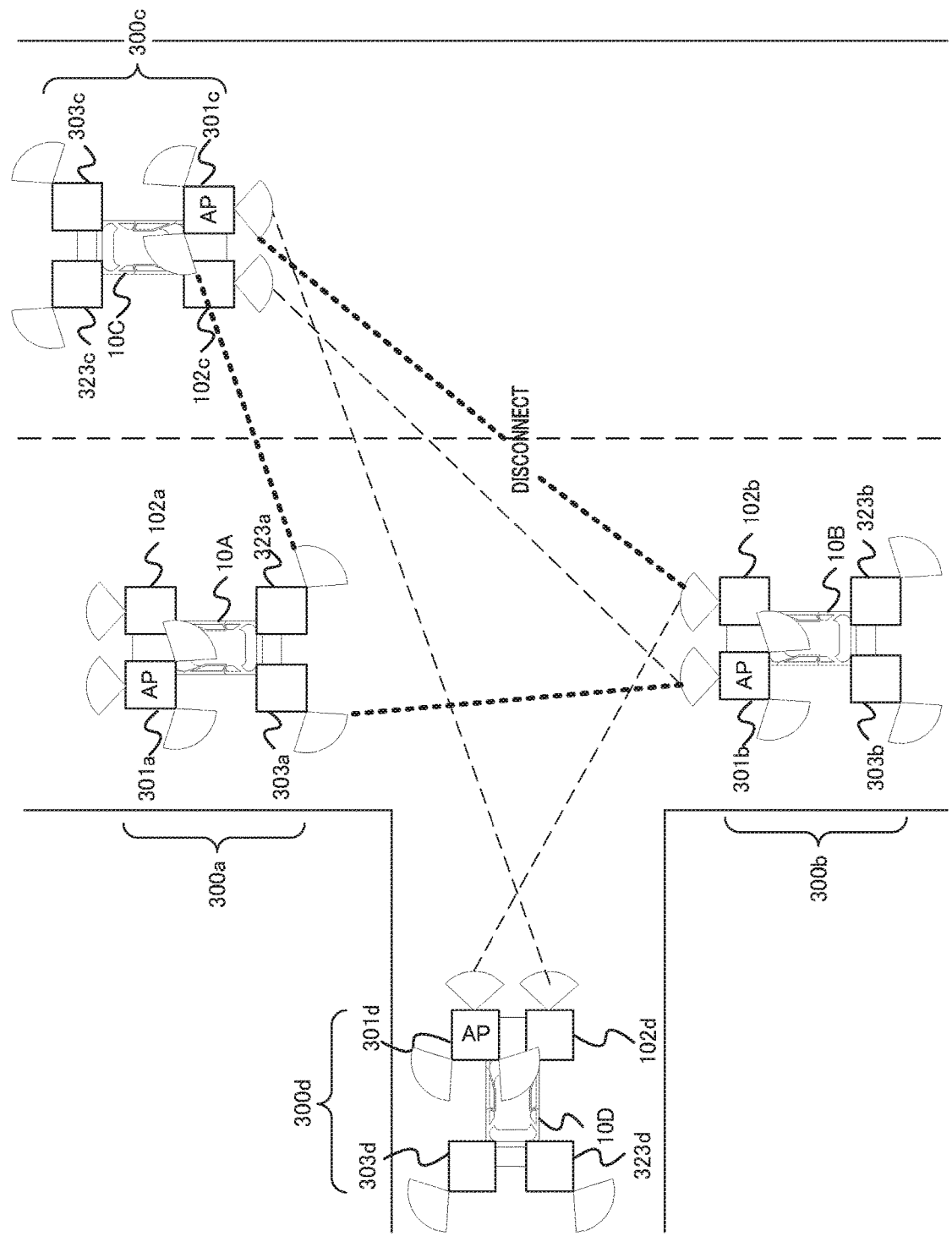
FIG. 14 illustrates exemplary inter-vehicle communication according to Embodiment 3.

FIG. 14 illustrates exemplary inter-vehicle communication according to Embodiment 3. Vehicles 10A, 10B, 10C, and 10D illustrated in FIG. 14 are each equipped with communication apparatus 300 illustrated in FIG. 13.

In the following description, in order to distinguish each communication apparatus 300 mounted on each of vehicles 10A, 10B, 10C, and 10D, a communication apparatus mounted on vehicle 10A may be referred to as communication apparatus 300a, a communication apparatus mounted on vehicle 10B may be referred to as communication apparatus 300b, a communication apparatus mounted on vehicle 10C may be referred to as communication apparatus 300c, and a communication apparatus mounted on vehicle 10D may be referred to as communication apparatus 300d.

Further, in order to distinguish each unit included in each of communication apparatuses 300a, 300b, 300c, and 300d, the reference numerals of the units included in each of communication apparatuses 300a, 300b, 300c, and 300d may be denoted with suffixes of a, b, c, and d, respectively.

Communication apparatuses 300a, 300b, 300c, and 300d mounted on vehicles 10A, 10B, 10C, and 10D, respectively, perform communication based on an infrastructure mode.

Vehicles 10A and 10B travel in the same direction on the road, for example. Non-AP radio device 303a of vehicle 10A connects to AP radio device 301b of following vehicle 10B and performs in-line inter-vehicle communication with AP radio device 301b.

Non-AP radio devices 303a and 323a of vehicle 10A cover communication on the left rear side and the right rear side of vehicle 10A. For example, non-AP radio device 323a of vehicle 10A communicates with AP radio device 301c of vehicle 10C traveling on the oncoming lane.

AP radio device 301c of vehicle 10C covers communication on the front side, the right rear side, and the left rear side of vehicle 10C. For example, AP radio device 301c of vehicle 10C communicates with non-AP radio device 323a of vehicle 10A traveling on the oncoming lane. Further, for example, AP radio device 301c of vehicle 10C communicates with non-AP radio device 102b of vehicle 10B traveling on the oncoming lane.

The operation of communication apparatus 300 is the same as the operation described in the flow chart in FIG. 8, and the description thereof is omitted.

As described above, AP radio device 301 and antennae 111, 311, and 321 may transmit and receive a radio wave toward and from the front side, the right rear side, and the left rear side of vehicle 10. Thus, communication apparatus 100 can communicate with communication apparatuses of vehicles 10 traveling in the front, the rear, the right side and the left side.

In the above-described embodiments, the term "portion" or "device" used for the name of a component may be replaced with another term such as "circuitry", "assembly", "device", "unit", or "module".

The description has been given of embodiments with reference to the drawings, but the present disclosure is not limited to the examples. It is apparent that variations or modifications in the category described in the claims may be conceived of by a person skilled in the art. It is to be understood that such variations or modifications fall within the technical scope of the present disclosure. In addition, component elements in the embodiments may be optionally combined without departure from the spirit of the present disclosure.

The present disclosure can be realized by software, hardware, or software in cooperation with hardware. Each functional block used in the description of each embodiment described above can be partly or entirely realized by an LSI such as an integrated circuit, and each process described in the embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

The technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include a radio frequency (RF) module and one or more antennae. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication apparatus performing a function of communication described in the present disclosure. For example, the communication apparatus may comprise a controller or a sensor that generates control signals or data signals which are used by a communication apparatus performing a communication function of the communication apparatus.

The communication apparatus also may include an infrastructure facility, such as a base station, an access point, and any other apparatuses, devices or systems that communicate with or control apparatuses such as those in the above non-limiting examples.

SUMMARY OF EMBODIMENTS

A communication apparatus according to the present disclosure is a communication apparatus mounted on a vehicle, the communication apparatus including: a first communication circuit that operates as an access point of an infrastructure mode and transmits and receives a radio wave toward and from a front side of the vehicle; and a second communication circuit that operates as a station of an infrastructure mode and transmits and receives a radio wave toward and from the front side of the vehicle.

In the communication apparatus according to the present disclosure, in a case where a radio link with a communication apparatus of a first vehicle has established when the vehicle enters a predetermined area including an intersection, the second communication circuit disconnects the radio link with the communication apparatus of the first vehicle.

In the communication apparatus according to the present disclosure, the second communication circuit establishes a radio link with a communication apparatus of a second vehicle different from the communication apparatus of the first vehicle.

In the communication apparatus according to the present disclosure, the second communication circuit selects, based on a quality of a beacon signal, a communication apparatus of a second vehicle with which the second communication circuit establishes a radio link.

In the communication apparatus according to the present disclosure, the second communication circuit selects, based on a number of increased subnets, a communication apparatus of a second vehicle with which the second communication circuit establishes a radio link.

In the communication apparatus according to the present disclosure, the second communication circuit gives higher priority to establishment of a radio link with a roadside device than establishment of a radio link with a communication apparatus of another vehicle.

In the communication apparatus according to the present disclosure, the first communication circuit transmits a probe response signal including information on an access point of a communication apparatus of another vehicle.

In the communication apparatus according to the present disclosure, the first communication circuit transmits and receives a radio wave toward and from a rear side of the vehicle.

In the communication apparatus according to the present disclosure, the second communication circuit transmits and receives a radio wave toward and from a rear side of the vehicle.

A communication method according to the present disclosure is a communication method for a communication apparatus mounted on a vehicle, the communication method including: performing, by a first communication circuit, an operation as an access point of an infrastructure mode; transmitting and receiving, by the first communication circuit, a radio wave toward and from a front side of the vehicle; performing, by a second communication circuit, an operation as a station of an infrastructure mode; and transmitting and receiving, by the second communication circuit, a radio wave toward and from the front side of the vehicle.

The disclosure of Japanese Patent Application No. 2020-121424, filed on Jul. 15, 2020, including the specification, drawings and abstract, is incorporated herein by reference in its entirety.

INDUSTRIAL APPLICABILITY

The present disclosure is suitable, for example, for radio communication between vehicles or between roadside devices and vehicles.

REFERENCE SIGNS LIST 10, 10A, 10B, 10C, 10D Vehicle
101, 101a, 101b, 101c, 101d AP radio device
301, 301a, 301b, 301c, 301d AP radio device
102, 102a, 102b, 102c, 103d Non-AP radio device
103, 103a, 103b, 103c, 103d Non-AP radio device
303, 303a, 303b, 303c, 303d Non-AP radio device
323, 323a, 323b, 323c, 323d Non-AP radio device
104, 105, 114, 314 Control device
106 Connection circuit
111, 112, 113, 311, 321, 313, 333 Antenna
200 Position detection device

The invention claimed is:

1. A communication apparatus mounted on a vehicle, the communication apparatus comprising:
a first communication circuit that operates as an access point of an infrastructure mode and transmits and receives a radio wave toward and from a front side of the vehicle; and
a second communication circuit that operates as a station of an infrastructure mode and transmits and receives a radio wave toward and from the front side of the vehicle,
wherein at least one of the first communication circuit or the second communication circuit transmits and receives a radio wave also toward and from a rear side of the vehicle while transmitting and receiving the radio wave toward and from the front side of the vehicle.

2. The communication apparatus according to claim 1, wherein
in a case where a radio link has been established between the second communication circuit and a communication apparatus of a first vehicle when the vehicle enters a predetermined area including an intersection, the second communication circuit disconnects the radio link with the communication apparatus of the first vehicle.

3. The communication apparatus according to claim 2, wherein
the second communication circuit establishes a radio link with a communication apparatus of a second vehicle different from the communication apparatus of the first vehicle.

4. The communication apparatus according to claim 2, wherein
the second communication circuit selects, based on a quality of a beacon signal, a communication apparatus of a second vehicle with which the second communication circuit establishes a radio link.

5. The communication apparatus according to claim 2, wherein
the second communication circuit selects, based on a number of increased subnets, a communication apparatus of a second vehicle with which the second communication circuit establishes a radio link.

6. The communication apparatus according to claim 1, wherein
the second communication circuit gives higher priority to establishment of a radio link with a roadside device than establishment of a radio link with a communication apparatus of another vehicle.

7. The communication apparatus according to claim 1, wherein
the first communication circuit transmits a probe response signal including information on an access point of a communication apparatus of another vehicle.

8. The communication apparatus according to claim 1, wherein
the first communication circuit transmits and receives a radio wave toward and from the rear side of the vehicle.

9. The communication apparatus according to claim 1, wherein
the second communication circuit transmits and receives a radio wave toward and from the rear side of the vehicle.

10. A communication method for a communication apparatus mounted on a vehicle, the communication method comprising:
performing, by a first communication circuit, an operation as an access point of an infrastructure mode;
transmitting and receiving, by the first communication circuit, a radio wave toward and from a front side of the vehicle;
performing, by a second communication circuit, an operation as a station of an infrastructure mode;
transmitting and receiving, by the second communication circuit, a radio wave toward and from the front side of the vehicle; and
transmitting and receiving, by at least one of the first communication circuit or the second communication circuit, a radio wave also toward and from a rear side of the vehicle while transmitting and receiving the radio wave toward and from the front side of the vehicle.

* * * * *